US007230545B2

(12) United States Patent
Nath et al.

(10) Patent No.: US 7,230,545 B2
(45) Date of Patent: Jun. 12, 2007

(54) AUTOMOBILE COMMUNICATION AND REGISTRY SYSTEM

(75) Inventors: Sanjeev Nath, New York, NY (US); Rajesh Patel, Rocky Hill, CT (US)

(73) Assignee: Nattel Group, Inc., New York, NY (US)

( * ) Notice: Subject to any disclaimer, the term of this patent is extended or adjusted under 35 U.S.C. 154(b) by 0 days.

(21) Appl. No.: 10/704,456

(22) Filed: Nov. 7, 2003

(65) Prior Publication Data

US 2005/0099320 A1 May 12, 2005

(51) Int. Cl.
*B60Q 1/48* (2006.01)
(52) U.S. Cl. .................... 340/932.2; 340/933
(58) Field of Classification Search ............ 340/932.1, 340/933, 937, 938, 904, 942, 905, 955, 5.9, 340/6.31, 932.2; 701/1, 36; 235/381, 385; 455/456.1, 461, 462; 342/357.06, 357.12
See application file for complete search history.

(56) References Cited

U.S. PATENT DOCUMENTS

| 3,034,287 | A | | 5/1962 | Odom et al. |
| 3,955,560 | A | | 5/1976 | Stein et al. |
| 4,031,991 | A | | 6/1977 | Malott |
| 4,137,520 | A | | 1/1979 | Deveau |
| 4,183,203 | A | | 1/1980 | Maezawa et al. |
| 4,742,573 | A | | 5/1988 | Popovic |
| 4,837,568 | A | | 6/1989 | Snaper |
| 5,204,670 | A | | 4/1993 | Stinton |
| D355,903 | S | | 2/1995 | Pollack et al. |
| 5,796,084 | A | * | 8/1998 | Olsson ........................ 235/384 |
| 6,052,065 | A | | 4/2000 | Glover |
| 6,133,855 | A | * | 10/2000 | Kim ........................ 340/932.2 |
| 6,340,935 | B1 | * | 1/2002 | Hall ........................ 340/932.2 |
| 6,513,711 | B1 | * | 2/2003 | Hjelmvik ..................... 235/385 |
| 6,526,335 | B1 | * | 2/2003 | Treyz et al. .................... 701/1 |
| 6,646,568 | B2 | * | 11/2003 | MacPhail et al. ......... 340/932.2 |
| 6,647,270 | B1 | * | 11/2003 | Himmelstein ............ 455/456.1 |
| 6,791,473 | B2 | * | 9/2004 | Kibria et al. ............ 340/932.2 |
| 6,816,085 | B1 | * | 11/2004 | Haynes et al. ........... 340/932.2 |

FOREIGN PATENT DOCUMENTS

CA    2413198 A1    5/2003

OTHER PUBLICATIONS

Bluetooth "All products" from www.bluetooth.com.
Bluetooth "What are some of the technical details of the Bluetooth wireless specifications?" from www.bluetooth.org.
Bluetooth "In what kinds of products can I expect to find Bluetooth wireless technology?" from www.bluetooth.org.
Bluetooth Bluetooth Enabled Products-Handheld Gryphon BT100-CS Bluetooth Cordless System from www.bluetooth.com.
Datalogic "Products" from www.datalogic.com.
Infrared Data Association (IrDA) "IrDA Specifications and Technical Notes" from www.irda.org.

(Continued)

*Primary Examiner*—Van T. Trieu
(74) *Attorney, Agent, or Firm*—Kelley Drye & Warren LLP

(57) ABSTRACT

The invention is directed to method and system for providing automatic vehicle registration and control via transceiver-facilitated wireless communication of a unique vehicle identification code and a vehicle location code from a vehicle.

14 Claims, 20 Drawing Sheets

VISUAL DIAGRAM OF
VEHICLE COMMUNICATING WITH INTELLIGENT COIN METER

OTHER PUBLICATIONS

Infrared Data Association—"Point and Shoot Profile" Version 1.1 Mar. 20, 2000 from www.irda.org, pp. 1-34.
Polgreen, Lydia. New York Times "To Get the Phone, Drivers are Willing to Risk Getting a Ticket" Sep. 2, 2003.
Job, Ann. "How to deal with Distracted Drivers" Report from http://Autos.msn.com/advice.
International Search Report mailed May 18, 2005 for International Application No. PCT/US04/36899.

* cited by examiner

VISUAL DIAGRAM OF
VEHICLE COMMUNICATING WITH INTELLIGENT MONITORING UNIT

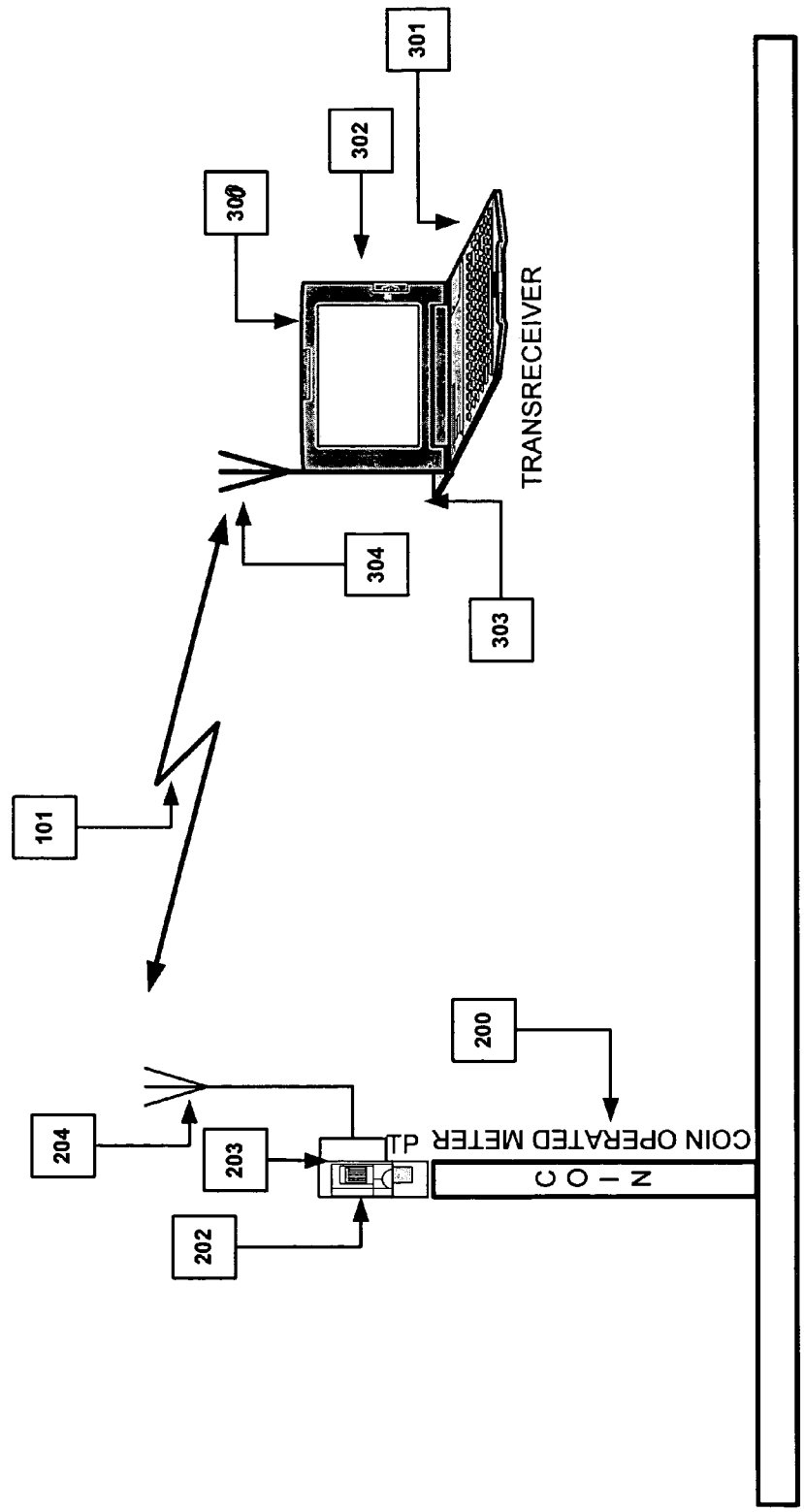

VISUAL DIAGRAM OF TRANSRECEIVER COMMUNICATING WITH INTELLIGENT MONITOR

INTELLI COIN FLOW

INTELLI MONITOR FLOW

TRANSRECEIVER FLOW

AUTOMOBILE COMMUNICATION AND REGISTRY SYSTEM

BACKGROUND OF THE INVENTION

1. Field of Invention

The present invention described and claimed herein relates to methods and systems for automated tracking, registry and control of vehicles moving or parking in a restricted access zone, such as a metered space as well as vehicles entering specific designated zones. These methods and systems provide means that may be used to display, store, record and communicate vehicle information via an intelligent wireless communication device carried by law enforcement personnel or placed inside a parking meter or any other suitable installation.

2. Discussion of Prior Art

A vehicle identification number (VIN) reading and transmitting devices, such as disclosed in U.S. Pat. No. 6,052,065, and further in U.S. Pat. Nos. 4,837,568; 4,742,573; 5,204,670; 3,955,560; 4,137,520; and U.S. Design 355,903, (which disclosures are incorporated herein in their entirety) are known in the art.

Numerous mechanical and electromechanical coin parking meters are as known as described, for example, in U.S. Pat. Nos. 4,031,991 and 4,183,203. Some of those meters automatically reset the residual parking time, U.S. Pat. No. 3,034,287. The disclosures of the aforementioned patents are incorporated herein in their entirety.

While these devices fulfill their respective particular objectives and requirements, the prior art does not suggest the Automobile Control and Registry System (ACARS). Such ACARS invention has multiple use including the identification of a vehicle located near a parking meter.

SUMMARY OF THE INVENTION

The present invention provides a method for wirelessly registering and monitoring a vehicle dynamic or static in a defined restricted-access zone. The present invention allows for the communication through an intelligent transceiver (IT) of information to and from a vehicle by a wireless signal to/from an intelligent wireless communication device (IWCD) suitably mounted at a location (e.g., without limitation, in a traffic signal, fire hydrant, stop sign, parking sign, bus stop). Such communication allows, for example, the identification and monitoring of a vehicle within a defined restricted access zone. In one embodiment such a system permits registration of a radio signal from the vehicle to an intelligent wireless communication device thereby ascertaining the identity and location of the vehicle within a defined restricted-access zone, and returning wirelessly information from the intelligent wireless monitoring device to the vehicle within the defined restricted access zone such as information pertaining to the conditions and parameters of time and place of the vehicle location. The communication between the vehicle within the defined restricted-access space and the intelligent wireless communication device is facilitated by an intelligent transceiver device capable of wirelessly transmitting vehicle identifying data and receiving vehicle location and/or permit-associated parameters of time and place. The defined restricted-access zone may be in the form of a parking space, a vehicle loading zone, a taxi stand, a diplomat-reserved space, and a purchase or personnel pick-up zone.

There are multiple situations where parking a vehicle in a metered zone or moving a vehicle through a designated zone or a restricted area is a big inconvenience. The present invention furnishes a novel solution to this problem. The system may comprise, for example (without limitation): (a) a device for helping to facilitate the enforcement of parking and other regulations as specified by the local law enforcement authorities; (b) a device for significantly automating law enforcement, thus significantly reducing cost by requiring a markedly reduced workforce as well as eliminating human error (e.g. illegible summons, or incorrect information); (c) a device capable to remotely monitor the overall registration and identification system; (d) a device that is continuously re-programmable with changing needs and regulations; (e) a device that is able to self generate a summons and is capable of communicating the information to an intelligent transceiver (IT) as well as to the automobile registry control system (ARCS) mounted in the vehicle; (f) a device to monitor the flow as well as to control the flow of vehicles as deemed necessary by the local traffic regulatory needs; (g) an automated device to increase the collection of revenue at significantly reduced costs; (h) a device to increase the availability of parking spaces occupied by non-paying vehicles idling at these locations; (i) a device for enforcement of departments of sanitation regulations; (j) a device to prevent unauthorized entry of vehicles into specified/restricted zones or areas; or (k) a device for tracking unidentified vehicles in designated zones.

The Automobile Communication and Registry System (ACARS) of this invention contains (a) a programmable unit containing the vehicle identification number (VIN); (b) an intelligent transceiver (IT) for communication with an automobile registry control system (ARCS); (c) an intelligent wireless communication device (IWCD) mounted for example inside a parking meter or other suitable installation, as well as carried by individual personnel; (d) an intelligent wireless monitoring device (IWMD) which may be mounted for example on roadside signs, traffic signals, street lamps, fire hydrants and miscellaneous items as deemed suitable by departments of transportation and other law enforcement agencies; (e) a display unit capable of displaying the vehicle registration information and other mandatory information pertaining to the same vehicle (e.g. ownership, insurance, registration, licensing and vehicle maintenance); (f) a communication unit which is able to communicate information and perform self-updates via IrDA, magnetic strip, bar code and smartcard interface; (g) optionally a communication unit capable to process fee collection from credit card, (h) a central processing unit equipped with an erasable programmable ROM (EPROM), a random access memory (RAM) as well as a secondary storage device capable of storing the above described information; and (i) an intelligent wireless communication device. In one embodiment, the intelligent transceiver (IT) may use for WLAN 802.11x and 802.16X standards, radio frequency, Bluetooth and IrDA technology.

In one embodiment, ACARS provides a method for displaying the vehicle registration information and other mandatory information pertaining to the same vehicle (e.g. ownership, insurance, registration, licensing and maintenance information) and provides a mechanism for storing and updating the Vehicle Registration Information and other mandatory information pertaining to the same vehicle (e.g. ownership, insurance, registration, licensing and maintenance).

In yet another embodiment, ACARS provides a device for communicating the presence of the vehicle within a defined range of the intelligent wireless communication device (IWCD) mounted inside the parking meter.

In yet another embodiment of the present invention, ACARS provides a mechanism for communicating the presence of the vehicle within a defined range of the intelligent wireless monitoring device (IWMD) mounted on, for example, any roadside installation.

ACARS may further provide for communication with the automobile registry unit and intelligent wireless communication device mounted inside, for example, the parking meter or any other roadside installation through an intelligent transceiver (IT).

(IT) may also be used to insert, modify and update the applications installed on the intelligent wireless communication device mounted inside the parking meter, etc., or any other roadside installation using the an intelligent transceiver (IT) unit. The intelligent receiver may be an integrated single unit as well as a platform device linking a wireless receiver unit with a wireless transmitter unit.

BRIEF DESCRIPTION OF THE DRAWINGS

These embodiments are deemed non-limiting exemplary embodiments, in which identical reference numerals identify similar representative structures throughout the several diagrams, and wherein, according to the present invention:

FIG. 1(c) depicts an exemplary systematic diagram of an intelligent transceiver (IT) unit communicating with an intelligent wireless communication device (IWCD) mounted inside a parking meter;

The Automobile Communication and Registry System (ACARS) is not limited to the current invention. It is a management system containing ARCS, intelligent wireless communication device (IWCD), an intelligent transceiver (IT), and an intelligent wireless monitoring device (IWMD). The exemplary embodiments set forth below are described in detail with reference to drawings, which are part of the description of the invention.

DETAILED DESCRIPTION OF THE INVENTION

The invention providing an automobile communication and registry system (ACARS) is described in detail below taking reference to the figures illustrating the systematic arrangement for maintaining communication by means of components comprising an ARCS, intelligent wireless communication device (IWCD) and an intelligent transceiver (IT) device.

As would be understood by one of ordinary skill in the art, ACARS can be applied in different situations such as, e.g., to determine if the vehicle is parked in a metered zone requiring permit or payment, to identify ownership of a vehicle, or to determine if a vehicle is stolen, or was cited for moving violations or is being operated contrary to some other vehicular rules and regulations as defined by local authorities. Law enforcement personnel carrying an intelligent wireless communication device will be able to integrate seamlessly with the automobile registry control system (ARCS), an intelligent wireless monitoring device (IWMD) and an intelligent wireless communication device (IWCD) mounted inside for example any parking meter and/or any roadside installation.

Figure 1A:
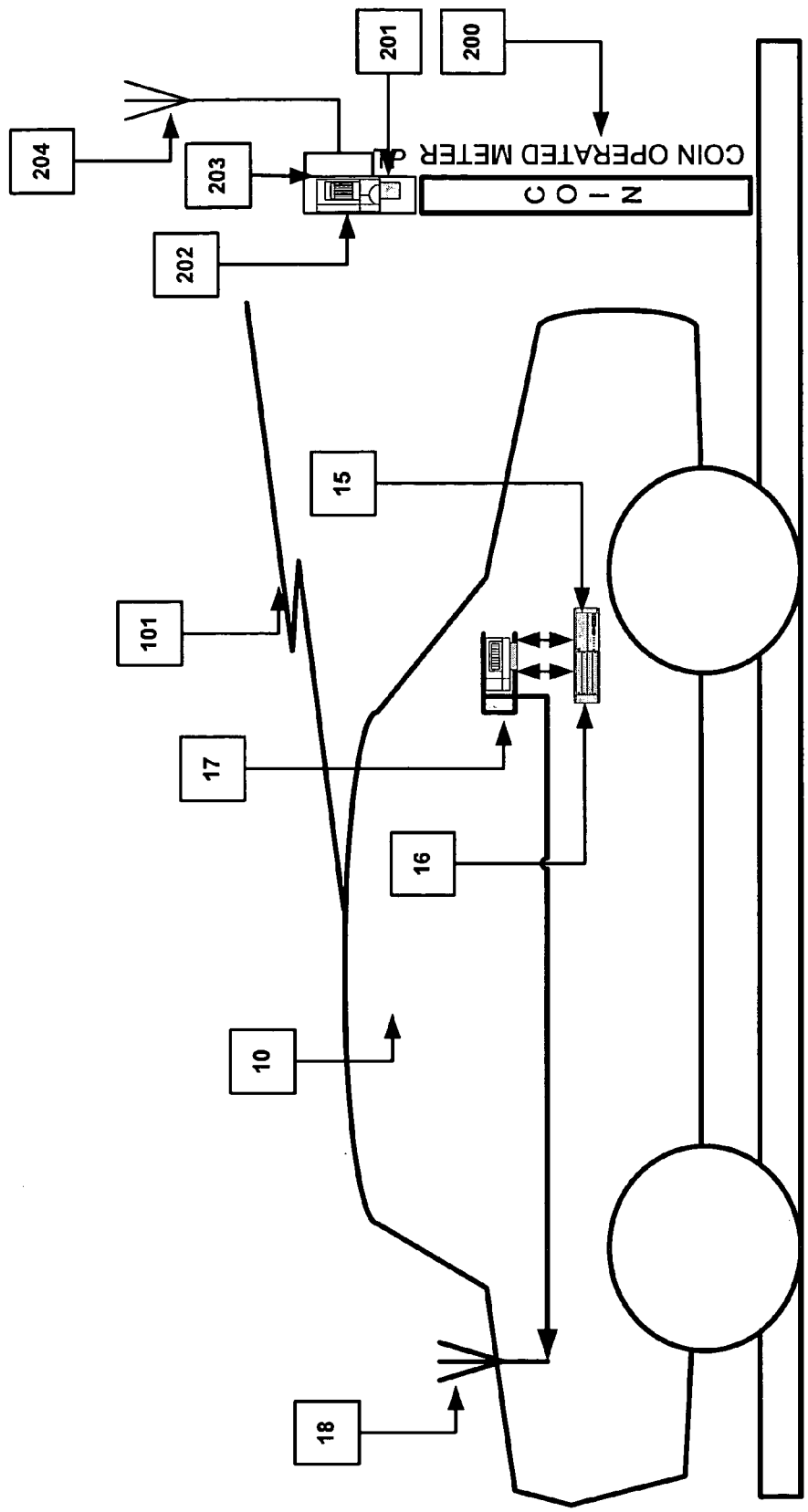
FIG. 1(a) depicts an exemplary systematic diagram of an automobile registry communication system (ARCS) interfacing with a intelligent wireless communication device (IWCD) mounted inside a parking meter.

FIG. 1(a) depicts one embodiment of the present invention. There is shown a system diagram of an automobile registry control unit (ARCS) interacting with a coin operated parking meter for time verification and payment. The system is designed so as to significantly reduce the use of human intermediaries thus effecting savings in time and other costs by the use of this electronic system as well as eliminating or minimizing human error (e.g. illegible summons, incorrect information and the like).

Referring to FIG. 1(a), a vehicle 10 is parked within a metered zone, that is within a defined distance of an intelligent wireless communication device (IWCD) (not shown) mounted inside parking meter 200. Parking meter 200 is defined as an installation for the purpose of timing and controlling the licensed parking zone or part thereof in return for payment which may be effected by e.g., a coin, token, pre-registered or newly entered credit card number. The communication between vehicle 10 equipped with ARCS and intelligent wireless communication device (IWCD) (not shown) mounted inside, for example, a coin operated parking meter 200 can be maintained, for example, using Bluetooth, WLAN IEEE 802.11x and 802.16x standards and radio frequency 101. The wireless spectrum (range) of ARCS can be regulated from the communication controller 16 and can be enhanced further by mounting an external Antenna 18. The main controller 15 is harnessed with display controller 17 and communication controller 16.

The coin operated parking meter 200 as diagrammed here is equipped with an intelligent wireless communication device (IWCD). In addition to the functionality provided by legacy coin operated parking meter, the IWCD is equipped with a coin bayonet slot 201, a display panel 203, a communication port 202 and external antenna 204.

Figure 1B:
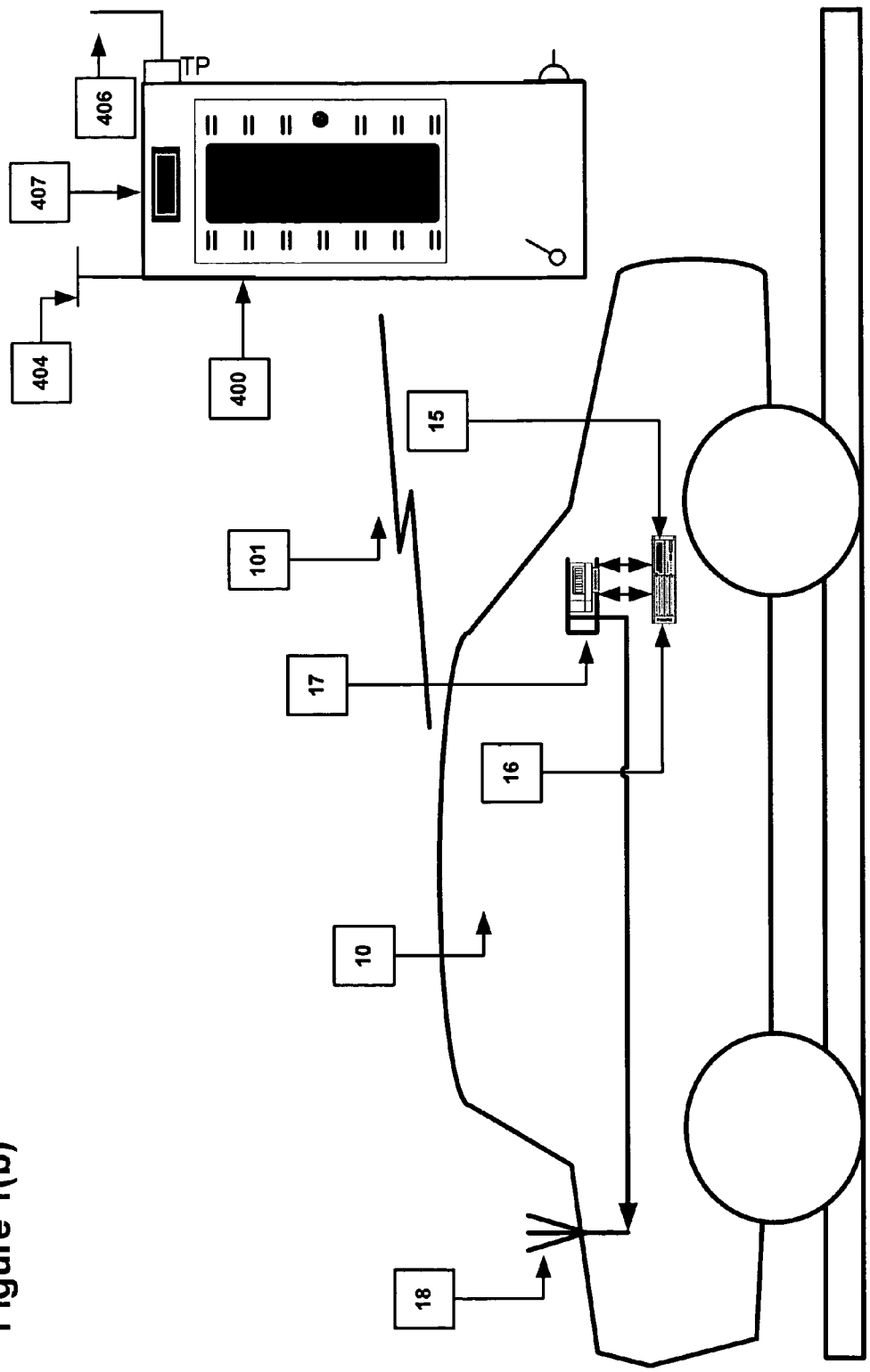
FIG. 1(b) depicts an exemplary systematic diagram of an automobile registry communication system (ARCS) interacting with a intelligent wireless monitoring device (IWMD)

Referring to the diagram detailed in FIG. 1(b), a vehicle 10 is parked within a defined distance from intelligent wireless monitoring device (IWMD) 400 and is in communication with vehicle 10 mounted with ARCS. Wireless communication is accomplished by using, for example, Bluetooth, WLAN IEEE 802.11x & 802.16x standards and/or Radio frequency 101. The wireless spectrum (range) of ARCS can be regulated from the communication controller 16 and can be enhanced further by mounting an external antenna 18. Intelligent wireless monitoring device (IWMD) is provided with a user friendly display interface 407. For the communication purpose IMD is pre-equipped with a communication port 406 and a wireless interface 404.

Referring to the diagram detailed in FIG. 1(c), intelligent transceiver (IT) 300 is communicating with the intelligent wireless communication device (IWCD). Intelligent transceiver (IT) 300 is a fully functional, wireless enabled, handheld computing device. It comprises a display panel 302, a fully functional keyboard 301, an auxiliary communication port 303, and plug-n-play interface with external antenna 304. Intelligent wireless communication device (IWCD) 200 mounted inside the parking meter is capable of interfacing easily with any legally coin operated parking meter.

Figure 1D:
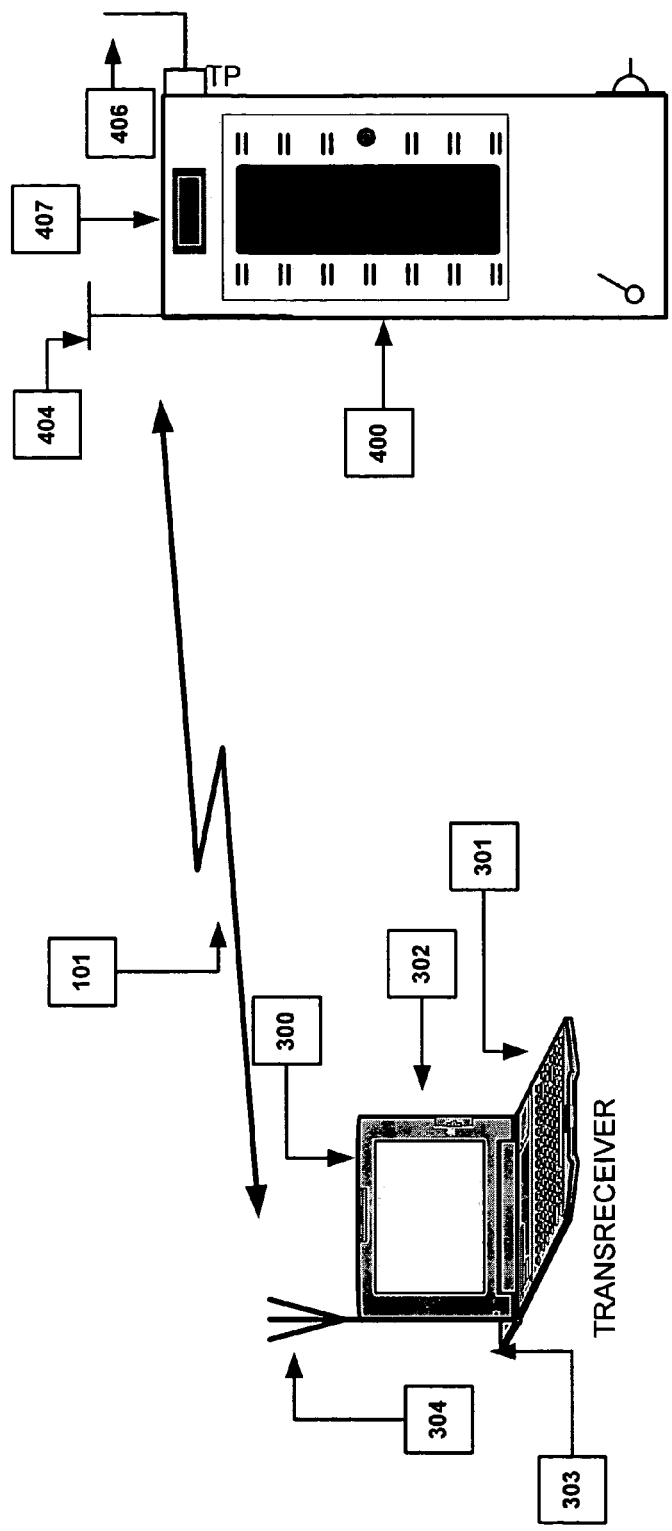
FIG. 1(d) depicts an exemplary systematic diagram of an intelligent transceiver (IT) unit communicating with an intelligent wireless monitoring device (IWMD)

FIG. 1(d), depicts a systematic diagram of a intelligent transceiver (I.T.) 300 communicating with a intelligent wireless monitoring device (IWMD) 400 mounted on any roadside installation, according to at least one embodiment of the present invention. The intelligent transceiver (IT) 300 is fully capable of integrating itself with the intelligent wireless monitoring device (IWMD) 400; it is, moreover, capable of installing, configuring and downloading the information for the intelligent wireless monitoring device (IWMD) 400. Intelligent transceiver (IT) 300 is capable of installing, configuring and downloading the information for intelligent wireless monitoring device (IWMD) 400 using conventional hardwired connectivity or can be easily interfaced, as would be understood by one of ordinary skill in the art, via wireless connectivity using Bluetooth, Wireless 802.11x and 802.16x and radio frequency technology. The communication, as by way of Radio frequency 101, can be facilitated between two individual equipment entities using WLan, Bluetooth or similar systems.

Figure 2:
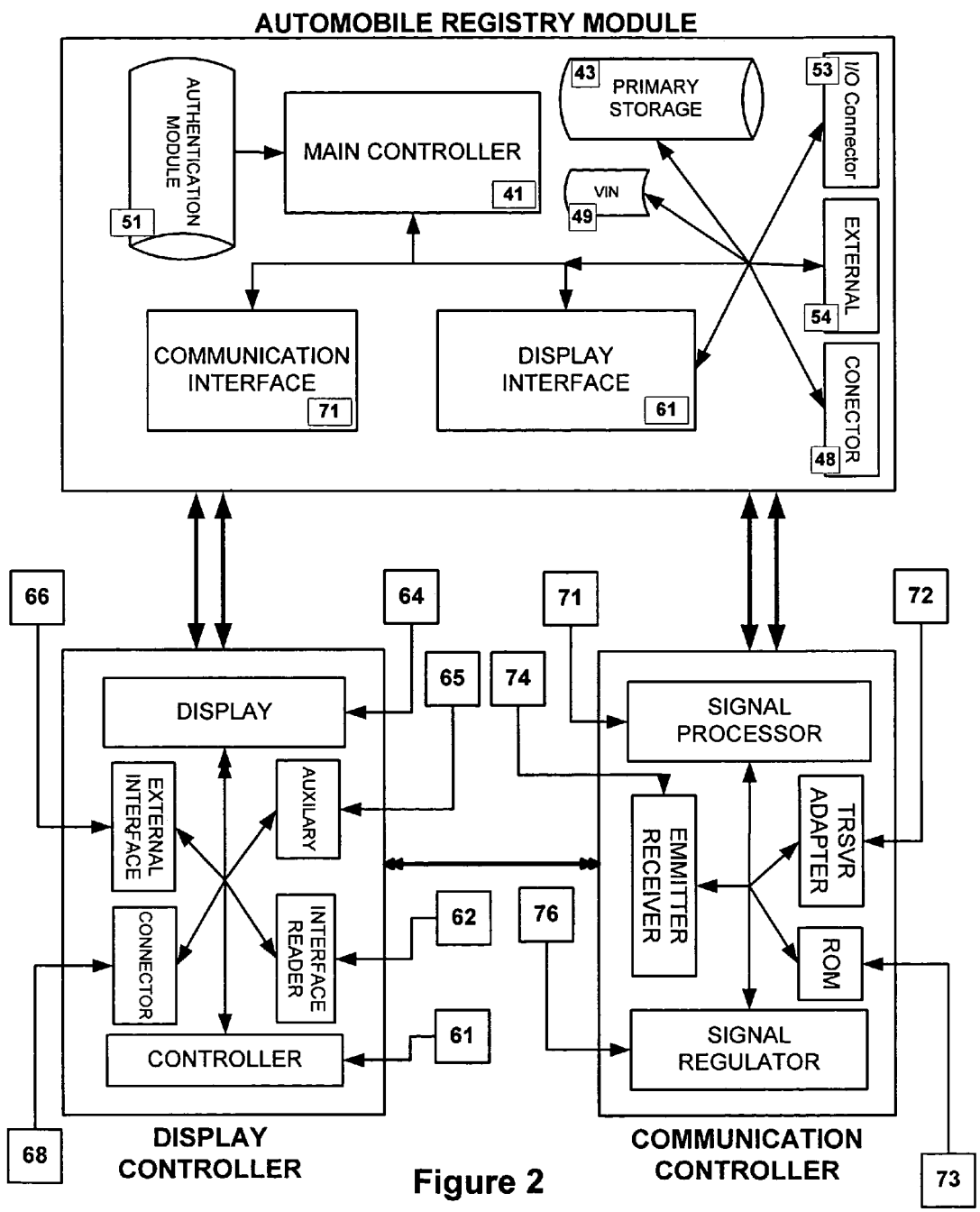
FIG. 2 depicts an exemplary systematic diagram of an intelligent transceiver (IT) unit simultaneously communicating with an intelligent wireless monitoring device (IWMD) and intelligent wireless communication device (IWCD)

FIG. 2 depicts an exemplary architecture of an automobile registry control system (ACARS) module. Vehicle 10 is mounted with the automobile registry control system (ARCS) which comprises three main components: (a) Main controller board 15; (b) Communication controller 16; and (d) Display Panel with IO interface 17.

Main controller 15 is mounted with an authentication module 51, a communication interface 71, a display interface 61 and external interface 54 which are shared by same system bus. The system also provided the VIN number 49 which is stored on a separate chipset, an extra physical storage 43, a set of connectors 48 and an I/O Connector 53. The display controller 16 consists of controller 61, an interface reader 62, an auxiliary interface 65, a display panel 64, sets of external interface 66 for external connectivity 68.

The communication controller 15 comes mounted with signal processor 71, a signal regulator 76, a transceiver adapter 72, and ROM 73, according to at least one embodiment of the present invention.

All the above mentioned components can be installed as one fully functional device or can be installed as individual working units depending on the end user specifications and requirements.

Figure 2A:
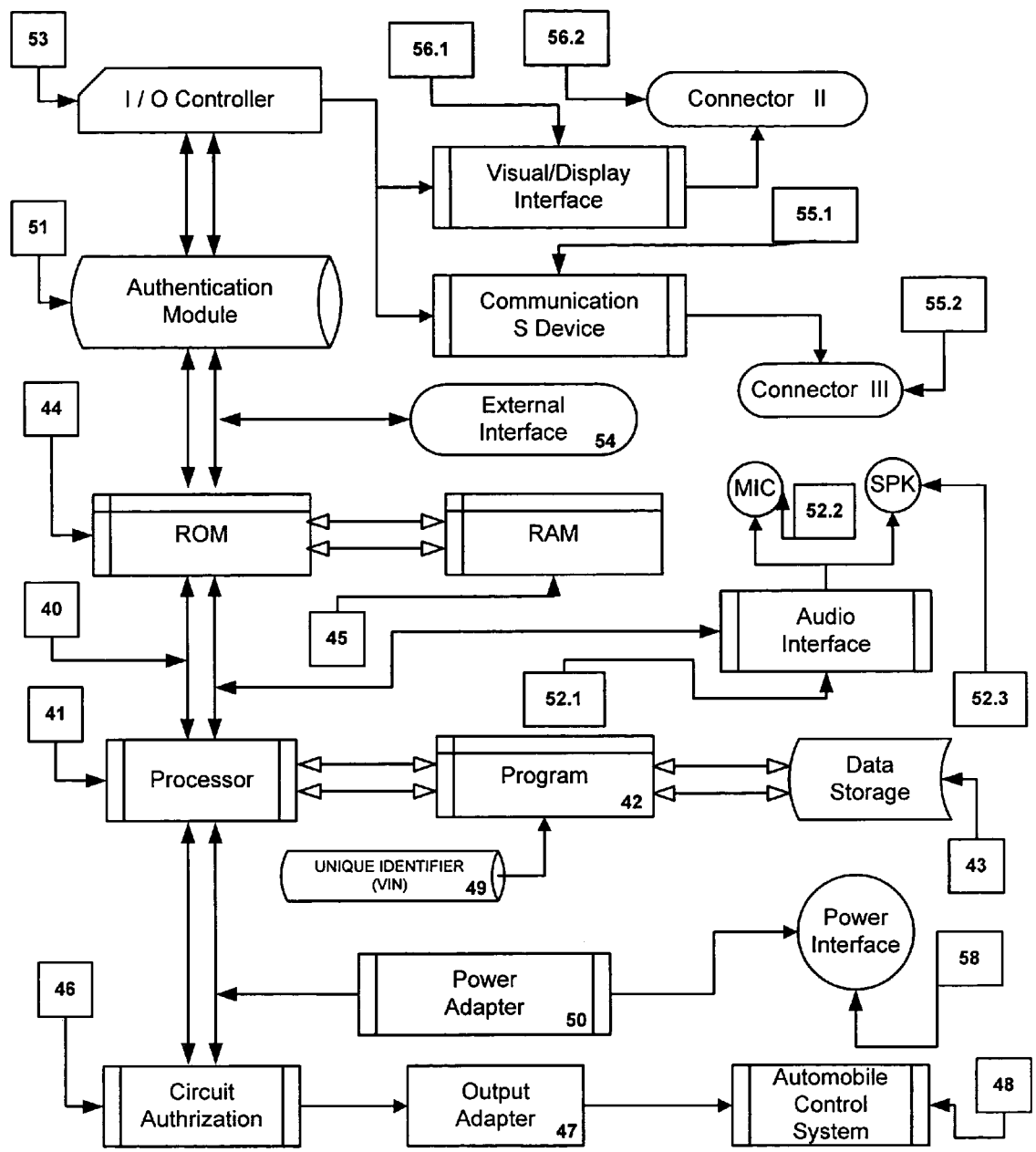
FIG. 2(a) depicts an exemplary functional block diagram of a main controller device (IMD)
Figure 2B:
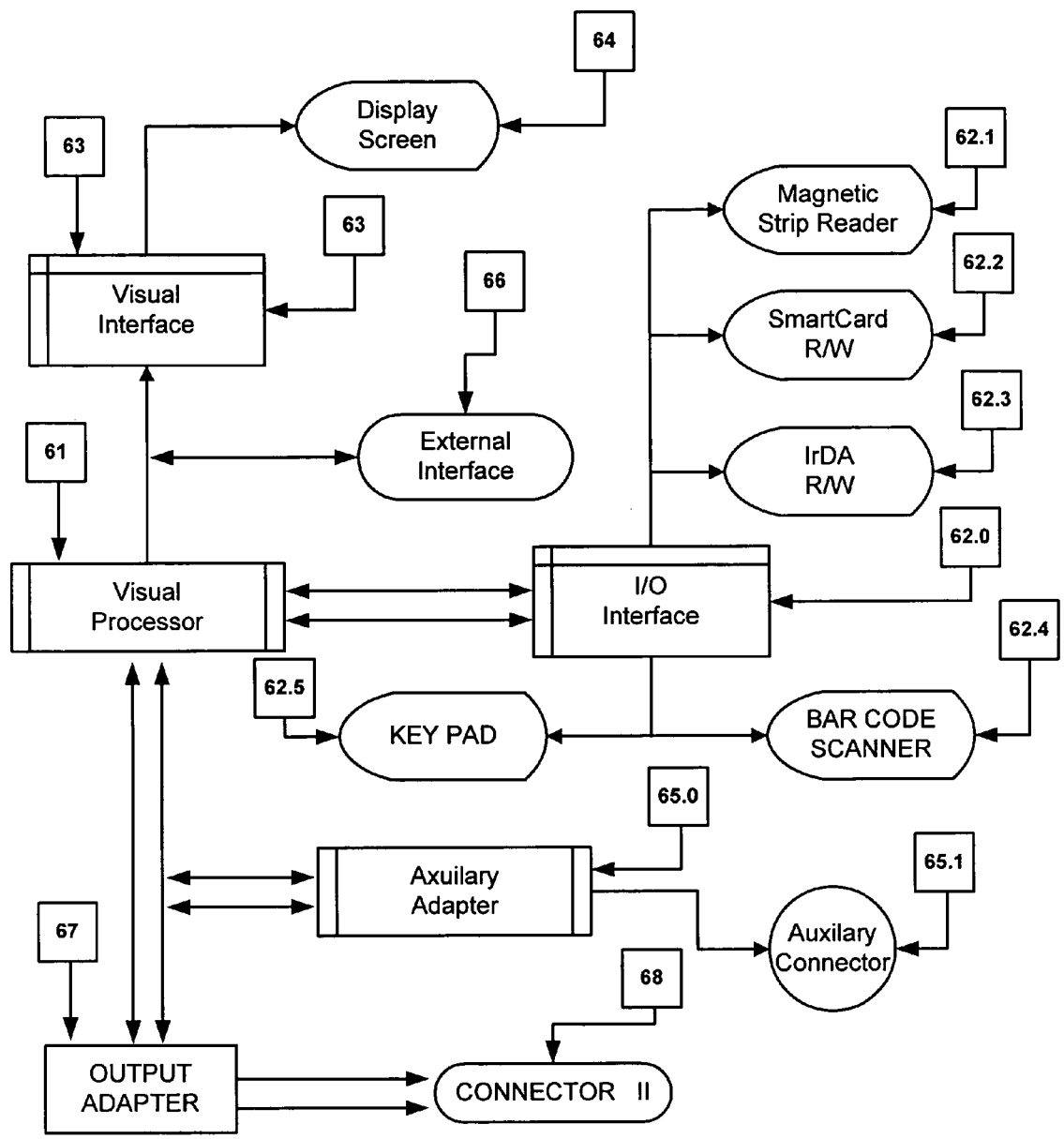
FIG. 2(b) depicts an exemplary system flow diagram of an intelligent display controlling device (IMD)
Figure 2C:
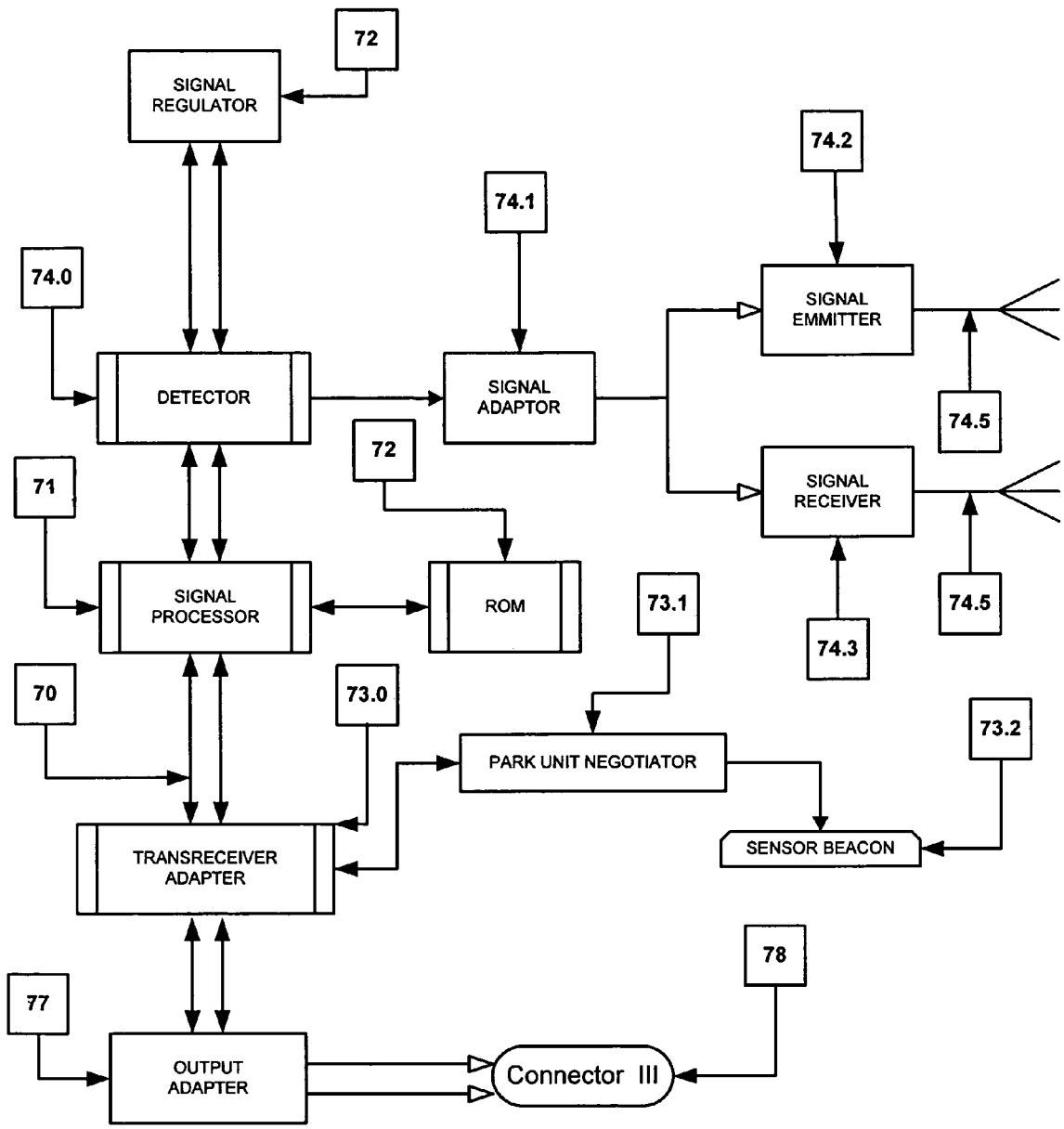
FIG. 2(c) depicts an exemplary communication controller component in detail.

Referring to overall system diagram of FIG. 2a, the main controller unit uses a single processor 41 which is connected by a system bus 40 with other peripheral devices. An operating system 42 running on the processor 41 provides control and may be used to coordinate the functions of the various components of the automobile registry control system (ARCS). The operating system 42 is stored in ROM 44 which is contained in the automobile registry control system (ARCS) and has sufficient amount of memory RAM 45. The data storage 43 is provided to store information uploaded to intelligent wireless communication device (IWCD) or from the intelligent transceiver (IT) 300. Various application programs for different automobile monitoring and control functions may be stored in Read Only Memory (ROM) 44. Such stored application programs may be moved in and out of RAM to be executed and to perform their respective functions. The ARCS main controller contains the hard-coded Vehicle Identification number 49 pre-programmed by the manufacturer. All existing vehicles can be programmed by matching the mandatory information provided to the State officials by the automobile manufacturers. A special two level authentication processes is provided to avoid or prevent any type of vandalism and theft. The main controller is married to the automobile computer system 48 with a special circuit authorization module 46 mounted on it via output adapter 47. Any separation, break or intrusion of the main controller or any of its installed components will disable the vehicle by shutting down all operational units. The main controller records the entire event and simultaneously starts the vandalism reporting transmission to the immediate receivers. The receiver can be an intelligent wireless communication device (IWCD), intelligent wireless monitoring device (IWMD) or an intelligent transceiver (I.T). In case of an error, the owner has full control to override the transmission by providing the two level security authentication codes. The main controller is powered by vehicle main power supply 50. It also has its own independent power supply 58 in case the main power supply fails or is intentionally disabled.

The main controller as in FIG. 2(a) is also mounted with an authentication module 51 containing a self-generated unique identification number which enables the main controller to interact with the display controller as well as the communication controller. Visual interface 56.1, a communication device 55.1, an audio interface 52.1 is also provided to communicate under defined circumstances connected via I/O controller 53. The auxiliary external interface 54 is also provided in case of emergency connectivity. The audio interface 52.1 is provided with connectivity with vehicle speaker system 52.3. The connectivity to the microphone 52.2 is optional. The connectivity to main controller are accomplished via connector 55.2 and 56.2.

FIG. 2(*b*) depicts an exemplary functional block diagram of an automobile registry Display controller (ARDC) which is defined in detail further down. The display controller is hard wired through connector 68 via output adapter 67. The connector 68 is connected to main controller through connector 56.2. The Display controller provides 5 different types of I/O Interface 62: (a) Magnetic Strip reader 62.1; (b) Smartcard Reader 62.2; (c) IrDA Reader and Writer 62.3; (d) Barcode Scanner 62.4, and (e) Miniature Key Pad 62.5.

The display controller is equipped with multi-lines, graphic compatible LCD display panel 64, which is controlled via visual interface module 63. The external interface module 66 is provided to communicate with ARCS in case of an emergency. The auxiliary connector 65.1 is provided for any future modifications or module integration. The visual processor B61 maintains the best visibility under extreme circumstances. All the future add-on is connected via auxiliary adapter 65.

FIG. 2(*c*), a communication controller component is defined in detail. The communication controller comes integrated with a signal processor 71 and an independent ROM 72 (other than main controller ROM). Communication controller is integrated to the main controller via an authentication module located inside the main controller. The transceiver adapter 73.0 is mounted inside the communication controller, which is connected to a sensor beacon 73.2 via park unit negotiator 73.1. The main functionality of Park Unit Negotiator 73.1 is to commence a handshake with the intelligent wireless communication device (IWCD) as soon as the vehicle comes into or is parked in a metered or restricted access zone. The transceiver adapter 73 calculates the grace time of "n" minutes which is granted for the handshake between the intelligent wireless communication device (IWCD) and the communication device. On successful completion of the handshake, the detector 74 initiates the communication signal with intelligent wireless communication device (IWCD). The Unique Parking Meter ID 84 (main controller) is registered in data storage 43 (main controller) located inside the main controller. The corresponding signals are emitted via signal emitter 74.2 and received by signal receiving module 74.3. The antennas 74.5 and 74.6 are pre-attached for enhanced signal resolution using signal adapter 74.1 in different weather conditions. The power supply is maintained through connector III 78 via output adapter 77. The signal regulator 72 mounted inside the communication controller regulates the spectrum of the signal transmitted.

The signal used for transmission can be accomplished via Bluetooth technology, Conventional radio frequency or Wireless communication using IEEE 802.11x & 802.16x standards. The Bluetooth's native ad-hoc network property makes it very useful by replacing bulky cables, providing printing support or acting as ID cards. The Bluetooth wireless specification includes both link layer and application layer definitions for product developers which support data, voice, and content-centric applications. Handheld wireless communication devices that comply with the Bluetooth wireless specification operate in the unlicensed, 2.4 GHz radio spectrum ensuring communication compatibility worldwide. These radio devices use a spread spectrum, frequency hopping, full-duplex signal at up to 1600 hops/sec. The signal hops among 79 frequencies at 1 MHz intervals to give a high degree of interference immunity. Up to seven simultaneous connections can be established and maintained. (Further details can be viewed at www.bluetooth.org or www.bluetooth.com.)

Radiofrequency (Rf) is another name for radio waves. It is one form of electromagnetic energy that makes up the electromagnetic spectrum. Electromagnetic energy consists of waves of electric and magnetic energy moving together (radiating) through space. The area where these waves are found is called an electromagnetic field.

Radio waves are created due to the movement of electrical charges in antennas. As they are created, these waves radiate away from the antenna. All electromagnetic waves travel at the speed of light. The major differences between the different types of waves are the distances covered by one cycle of the wave and the number of waves that pass a certain point during a set time period. The wavelength is the distance covered by one cycle of a wave. The frequency is the number of waves passing a given point in one second. For any electromagnetic wave, the wavelength multiplied by the frequency equals the speed of light. The frequency of an Rf signal is usually expressed in units called hertz (Hz). (One Hz equals one wave per second. One kilohertz (kHz) equals one thousand waves per second, one megahertz (MHz) equals one million waves per second, and one gigahertz (GHz) equals one billion waves per second).

Rf energy includes waves with frequencies ranging from about 3000 waves per second (3 kHz) to 300 billion waves per second (300 GHz). Microwaves are a subset of radio waves that have frequencies ranging from around 300 million waves per second (300 MHz) to three billion waves per second (3 GHz).

Basically WLAN is an ordinary LAN protocol which is a modulated carrier of radio frequency waves. WLAN IEEE 801.11 is a natural extension to LAN Ethernet, and the modulated protocol is IEEE 802.3 (Ethernet 3).

Common WLAN Products, which are using IEEE standards, are based on IEEE 802.11 and 802.11b specification. 802.11b is a high rate extension to the original 802.11, and specific 5.5 to 11 Mbps data rate. The next HyperLAN2 generation using IEEE 802.11a, IEEE 802.11 g standards, operates in a new band frequency of 5 GHz, and achieves a high data rate as 54 Mbps. The new networking technology WiMax IEEE 802.16x should provide higher speed, and more coverage than existing Wi-Fi standards.

Figure 3:
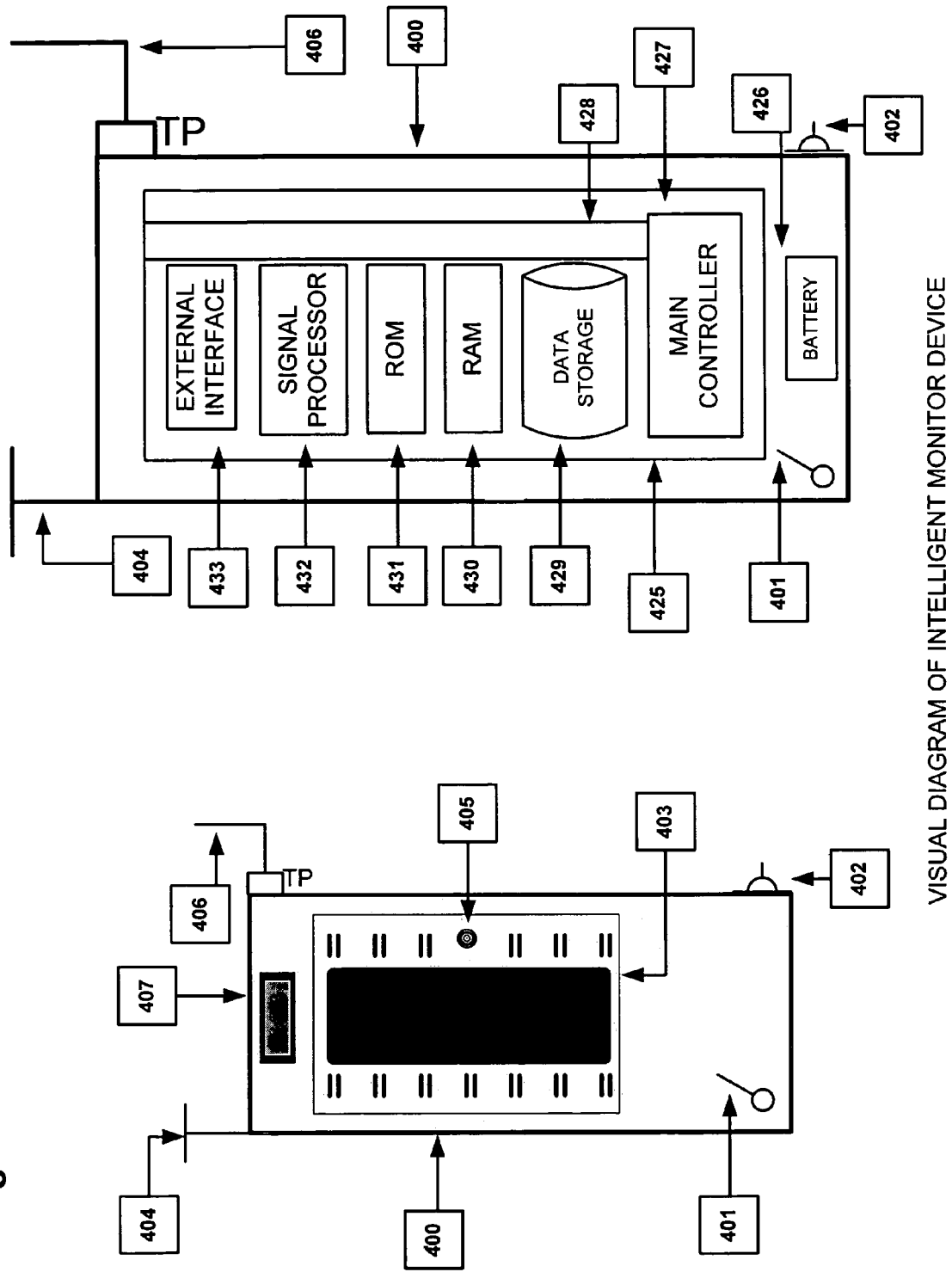
FIG. 3 depicts an exemplary functional block diagram of an intelligent wireless communication device (IWCD) mounted inside a coin-operated parking meter.

FIG. 3 is an exemplary functional block diagram of an intelligent wireless monitoring device (IWMD) 400 as may be mounted on any roadside installation. The intelligent wireless monitoring device (IWMD) 400 case, for example, can be fashioned with a heavy gauge, die-formed and reinforced steel with a plastic color coat. The interior of the case is fully insulated and sealed to protect the internal components from the effects of extreme heat and cold, and to prevent water condensation. In addition to being insulated, the case also features ventilation holes at the top and bottom of the unit. These holes are vandal-proof and aid in cooling the interior of the housing in the summer and reducing condensation in the winter. In one particular embodiment of the invention, the ventilation holes in the top of the casing can be closed in the winter to limit the passage of cold air through the device. At the same time, the ventilation holes in the bottom of the protective housing remain open, allowing for the escape of moisture.

The access door 403, like the protective housing itself, is preferably constructed of heavy gauge steel. The access door 403 is secured to the housing by means of a two-point locking system. This locking system may consist of two stainless steel hinge pins, and two latch bolts 405. A seal is formed between the access door and the housing by rubberized weather seals inset into a channel. These seals prevent moisture and dust from entering the housing itself. The intelligent wireless monitoring device (IWMD) is equipped with communication port 406 for physical connectivity. It is wireless enabled and for enhanced reception it comes equipped with an external antenna 404. There is a multi-line LCD panel mounted on the front of the equipment, for viewing the interface log. The power supply 402 for the machine may be provided by hard-wiring the device to conventional AC power lines, by solar panels, by batteries, or a combination of any of these. Power consumption is held to a minimum by providing a "sleep" mode. For emergency a set of re-chargeable batteries are mounted inside the case. The main controller 425 connects data storage 429, memory 430, 431, via system bus 428. The device provides multiple communication interfaces via communication port 406 and wireless interface 404. An external interface 433 is provided to enhance the functionality and/or add on module. The internal battery 426 is provided in case the main power is interrupted.

Figure 4:
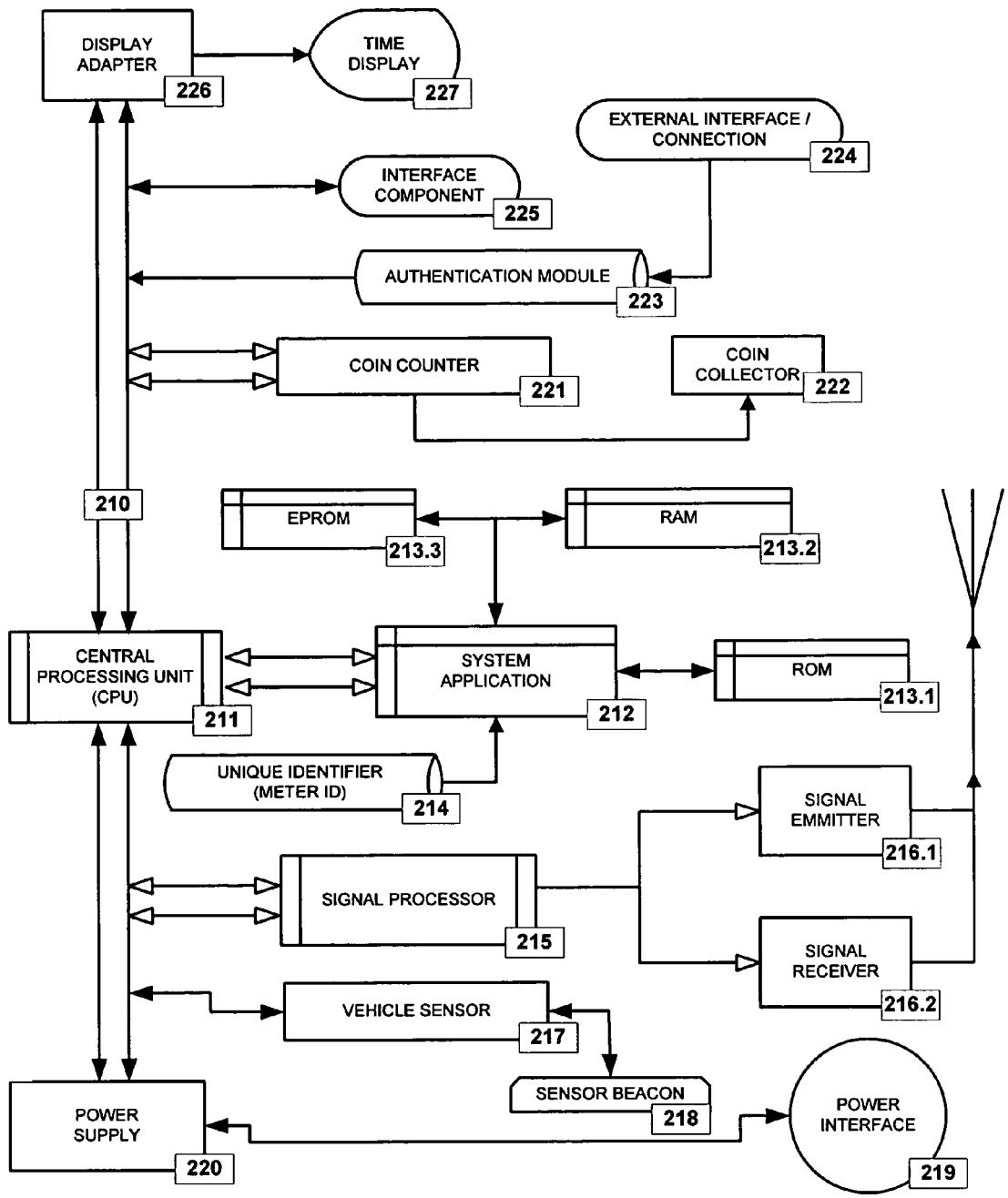
FIG. 4 depicts an exemplary functional block diagram of an intelligent wireless communication device (IWCD) useful in the present invention.

FIG. 4 is an exemplary functional block diagram of an intelligent wireless communication device (IWCD) mounted inside the coin operated parking meter 200. The housing of coin operated parking meter 200 is aesthetically pleasing. In addition with simplicity of design and easy prompts it results in a user friendly device. The case itself is forged in heavy gauge, reinforced cold rolled steel, with a durable color coat. The interior of the case is fully insulated to protect the internal components in extreme conditions.

With full backward compatibility with the legacy coin operated parking meter, it is fully equipped with an intelligent controller, a display panel 203, a communication port 202, a unique bayonet coin slot 201 and a signal emitter/receiver 204. It provides universal connectivity with most of the legacy coin parking meters.

The power supply to the intelligent wireless communication device (IWCD) mounted inside the coin operated parking meter 200 may be hardwired by conventional AC power lines, by solar panels, by low consumption batteries or combination of any of these or other power sources. The power supply adapter 220 regulates and supplies the correct voltage to the controller board. The module has a provision for secondary power which can be easily interfaced via a power interface 219.

The device has an onboard central processing unit 211 and is interconnected to the various sub-components via a system bus 210. The system application 212 runs on the processor 211 and provides control and may be used to coordinate the functions of the various components of the system. The system application 212 is stored in ROM 213.1 and its sub-functionality can temporarily be made to run from the RAM 213.2 increasing the performance of overall system communication. Some of the add-on utilities are stored on the EPROM 213.3. The Unique Meter Identifying Number 214 is stored in an encrypted mode on a separate media, which is readily available upon the request made by the application 212.

The presence of the vehicle 10 parked near the parking meter, is sensed by sensor beacon 218 which is connected to a vehicle sensor controller 217. On the successful acknowledgement of the presence of the vehicle 10, the system 212 initiates the communication. The Unique Identifier 214 is transmitted to the parked vehicle 10. The coin counter 221 is a plug-n-play interface with legacy coin operated parking meter's coin collection module. The intelligent wireless communication device (IWCD) mounted inside the coin operated parking meter comes with pre-installed connectivity with coin collector module 221. Besides coin collection, the intelligent coin operated parking meter has a pre-configured modular interface component module 225 which is capable of processing the pre-paid parking cards.

The intelligent wireless communication device (IWCD) mounted inside the (i.e., coin-operated) parking meter is a multiline LCD panel 227 capable of displaying detailed information related to the parked vehicle and communicated when connected to the intelligent transceiver (IT). The external interface 224 is provided for maintenance purpose, in case equipment needs configuration changed or for updating the pre-existing applications or their sub-modules. Any type of connectivity will be authenticated by authentication module 223 mounted inside the device. The signal processor 215 differentiates between the incoming transmission via signal receiver 216.2 and outgoing transmission via signal emitter 216.1. The coin counting is done via coin counter 221.

Figure 5:
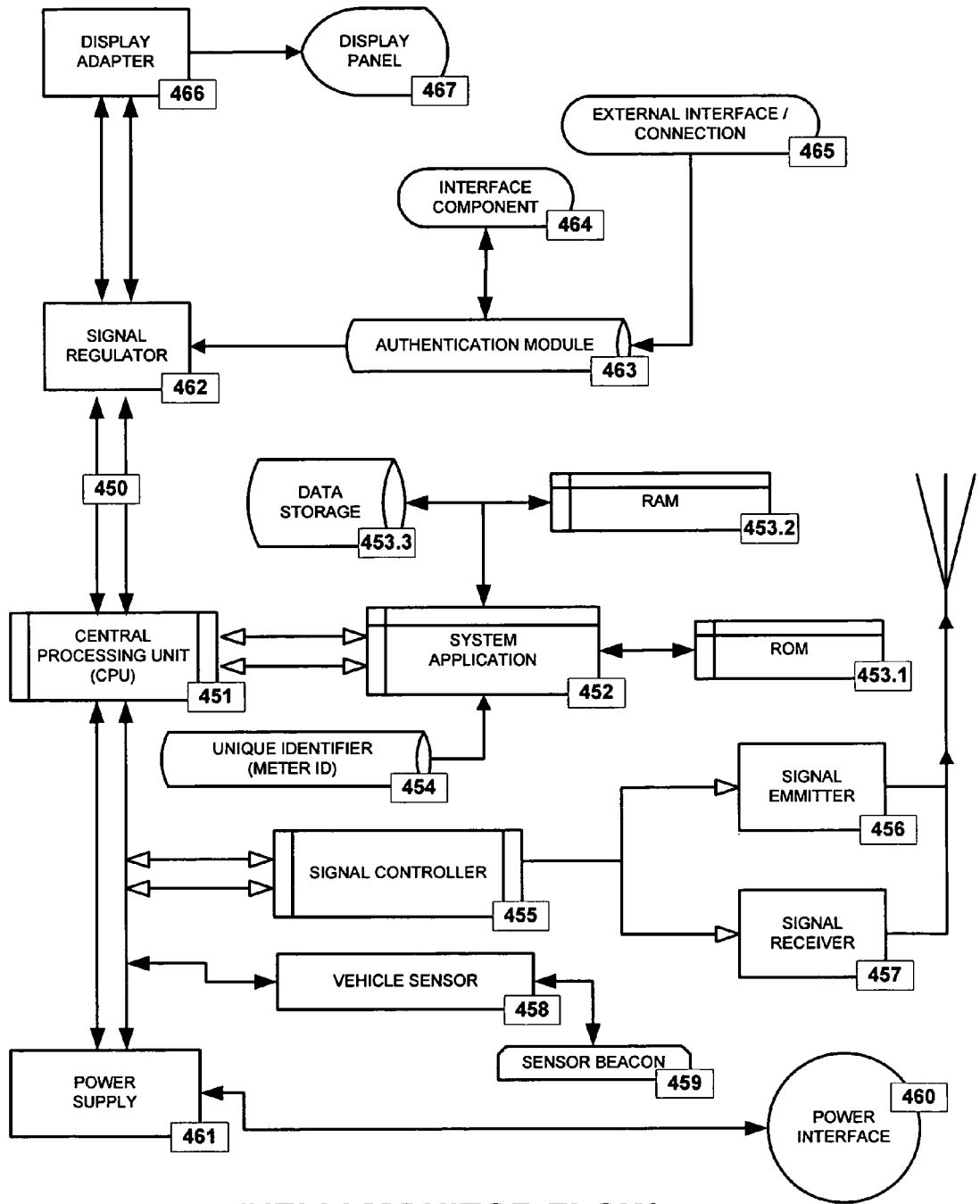
FIG. 5 depicts an exemplary functional block diagram of an intelligent wireless monitoring device (IWMD).

FIG. 5, an exemplary functional block diagram of an intelligent wireless monitoring device (IWMD) mounted on any roadside installation 400. The device has an onboard central processing unit 451 and is interconnected to the various sub-components via a system bus 450. The system application 452 runs on the processor 451 and provides control and may be used to coordinate the functions of the various components of the system. The system application 452 is stored in ROM 453.1 and its sub-functionality can temporarily be made to run from the RAM 453.2 increasing the performance of the overall system communication. Some of the add-on utilities are stored on data storage drive 453.3. The Unique Meter Identifying Number or Code 454 is stored in an encrypted mode on a separate media, which is readily available upon a request made by the application 454.

The presence of a mobile vehicle 10 is sensed by the sensor beacon 459 which is connected to a vehicle sensor controller 458. On the successful acknowledgement of the presence of the vehicle 10 the system 452 initiates the communication. The Unique Identifier 454 is transmitted to the mobile vehicle 10. The intelligent wireless monitoring device (IWMD) has a multi line LCD panel capable 467 of displaying detailed information related to the process executed, error display and equipment information, required by intelligent transceiver (I.T.). The external interface 465 is provided for maintenance purposes, in case equipments need configuration changes or updating the pre-existing applications or its sub modules. Any type of connectivity will be authenticated by the authentication module 463 mounted inside the device. The signal processor 455 differentiates between the incoming transmission via signal receiver 456 and outgoing transmission via signal emitter 457. The transmission signal spectrum can be regulated by the signal regulator 462. The external interface 464 component is provided for future add-ons. The power supply 461 is supplied by vehicle it self, along with this power interface 460.

Figure 6:
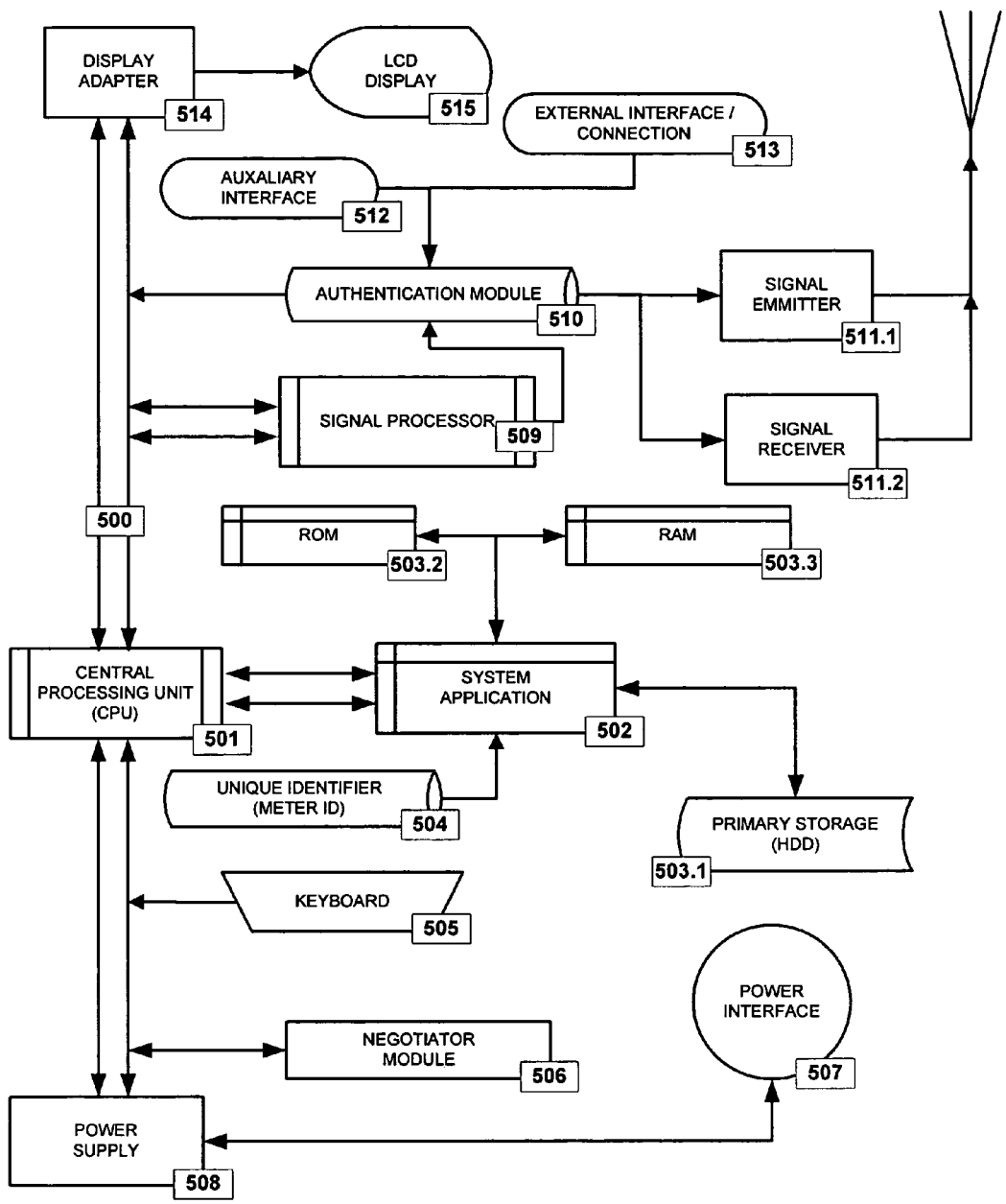
FIG. 6 depicts an exemplary functional block diagram of an Intelligent transceiver (IT) unit useful in the present invention.

FIG. 6 depicts an exemplary functional block diagram of an intelligent transceiver (IT) unit. The case of transceiver 300 is aesthetically pleasing. In addition with simplicity of design and easy prompts it results in a user friendly device. The case itself is forged to reinforced metal sheet from inside, with shock resistant rubber insulated jacket from outside. The interior of the case is fully insulated in combination with shock resistant material to protect the internal components in rigorous handling.

Referring to FIG. 6, the equipment had a display panel 515, a mobile processor 501, a unique keypad 505, and signal emitter/receiver 511.1 and 511.2. It provides the wireless connectivity with ARCS, intelligent wireless communication device (IWCD) mounted inside the coin operated parking meter and ARCS monitoring device using Bluetooth technology, conventional radio frequency or wireless communication using IEEE 802.11x & 802.16x standards. This technology has been defined in a later section. The intelligent transceiver (IT) is powered by low consumption re-chargeable batteries. The power supply adapter 508 regulates the correct amount of voltage supplied to the device. The module has a provision for the secondary/backup power supply which can be easily interfaced via power interface 507. The device has an onboard central processing unit 501 and is interconnected to the various sub-components via a system bus 500. The system application 502 runs on the processor 501 which provides control and may be used to coordinate the functions of the various components of the system. The system application 502 is stored in ROM 503.2 and its sub-functionality can temporarily be made to run from the RAM 503.2. The data transaction is stored on a secondary storage device 503.1. The Unique Identifier 504 is stored in an encrypted mode on a separate media, which is readily available on request made by the application 502.

Another inventive component of the transceiver system provides a Negotiator Module 506 that negotiates its connectivity with ARCS module, intelligent wireless communication device (IWCD) mounted inside the parking meter and ARCS monitoring device. On the successful acknowledgement by the negotiator module 506 the system exchanges the Unique Identifier 504 with intelligent wireless communication device (IWCD) mounted inside the parking meter or ARCS module or ARCS monitoring device. Besides data collection, the intelligent transceiver (IT) is capable of maintaining communication with all the above devices.

The intelligent transceiver (IT) has a multiline LCD panel capable of displaying information in detail. There is one set of external interface 513 provided for communication and maintenance purposes and one set of auxiliary interface 512 for future add-on hardware. All types of interfaces (incoming 511.1 or outgoing 511.2) are authenticated by the authentication module 510 mounted inside the device. The signal processor 509 regulates and differentiates between the incoming transmission via signal receiver 511.2 and outgoing transmission via signal emitter 511.1

FIG. 6 also represents a flowchart of an exemplary process of an ARCS monitoring system. The housing of ARCS monitoring device is forged to heavy gauge, reinforced cold rolled steel, with durable color coat. The interior of the case is fully insulated to protect the internal components in extreme conditions. It is fully equipped with an intelligent controller with ample storage, a communication port and signal receiver/emitter. The power supply to the ARCS—monitoring device can be hardwired to conventional AC power supply, solar panels, low consumption re-chargeable batteries or a combination of any of these. As diagrammed, the power supply 507 adapter regulates the voltage supplied to the controller board. The module has a provision for the secondary power which can be easily interfaced via power interface 508. The device has an onboard central processing unit 501 and is interconnected to the various sub-components via a system bus 500. The system application 502 runs on the processor 501 which provides control and may be used to coordinate the functions of the various sub-components of the system. The system application 502 is stored in ROM 503.1 and its sub-functionality can temporarily be made to run from the RAM 503.3 with enhanced performance of the overall system and its communication. All the data transaction is stores on secondary storage device 503.2. The Unique Identifier 509 is stored in an encrypted mode on a separate media, which is readily made available upon request by application 502.

The vehicle 10 passing by the monitoring device is sensed by a sensor beacon 506.2 which is connected to vehicle sensor controller 506.1. Any type of violations are immediately recorded and successfully transmitted to the vehicle 10. All the transactions are then transmitted to the intelligent transceiver (I.T) 300. The External interface 513 is provided for maintenance purposes in case the equipment needs configuration changes or updates to the pre-existing applications or their sub modules. Any type of connectivity will be authenticated by the authentication module 512 mounted inside the device. The signal processor 504 is used to differentiate between the incoming transmission via signal receiver 505.2 and outgoing transmission via signal emitter 505.1.

Figure 7:
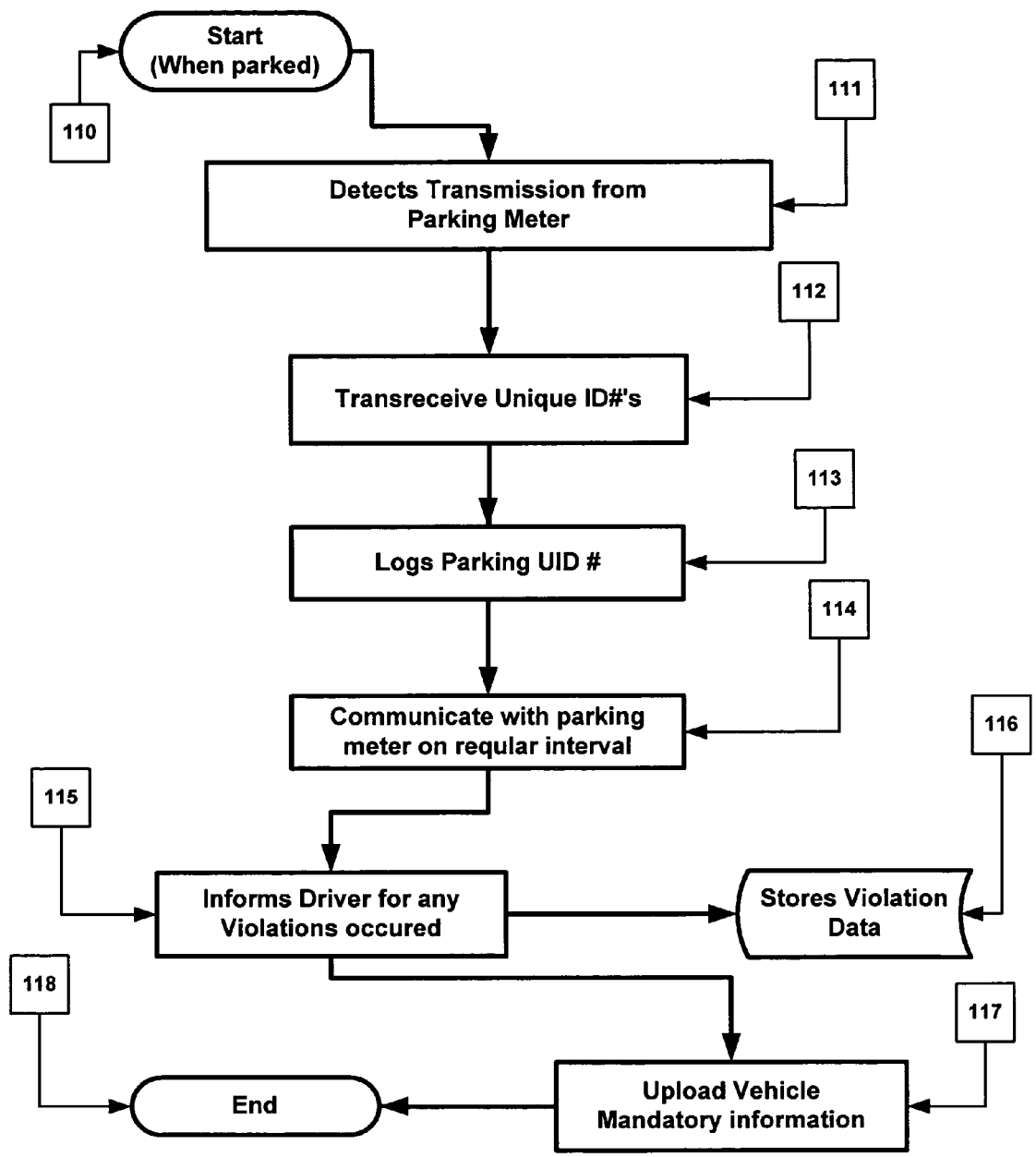
FIG. 7 is a flowchart of an embodiment depicting a process in which an automobile control and registry system (ARCS) of the present invention may find use.

FIG. 7 represents an ARCS system flow in communication with intelligent wireless communication device (IWCD) mounted inside the coin operated parking meter, and ARCS monitoring device. At step 110 is initiated when vehicle comes in the range of parking meter or enters metered zone. Step 111 is executed when vehicle is in stationary mode in parking spot. Next step 112 is followed exchanging the Unique Identifiers (in case of vehicle the VIN is transmitted and in case of a parking meter monitor, the Unique Meter identifier is transmitted. The ARCS logs the unique parking identifying number on its own hard drive—Step 113. The ARCS communicates with the intelligent wireless communication device (IWCD) mounted inside the Parking meter on regular intervals—step 114. It informs the vehicle operator of impending violation—step 115. The ARCS has a final warning that the vehicle operator is in violation of rules. The transaction is logged on a local drive, step 116, which later can be downloaded by the operator of that vehicle—step 117.

Figure 8A:
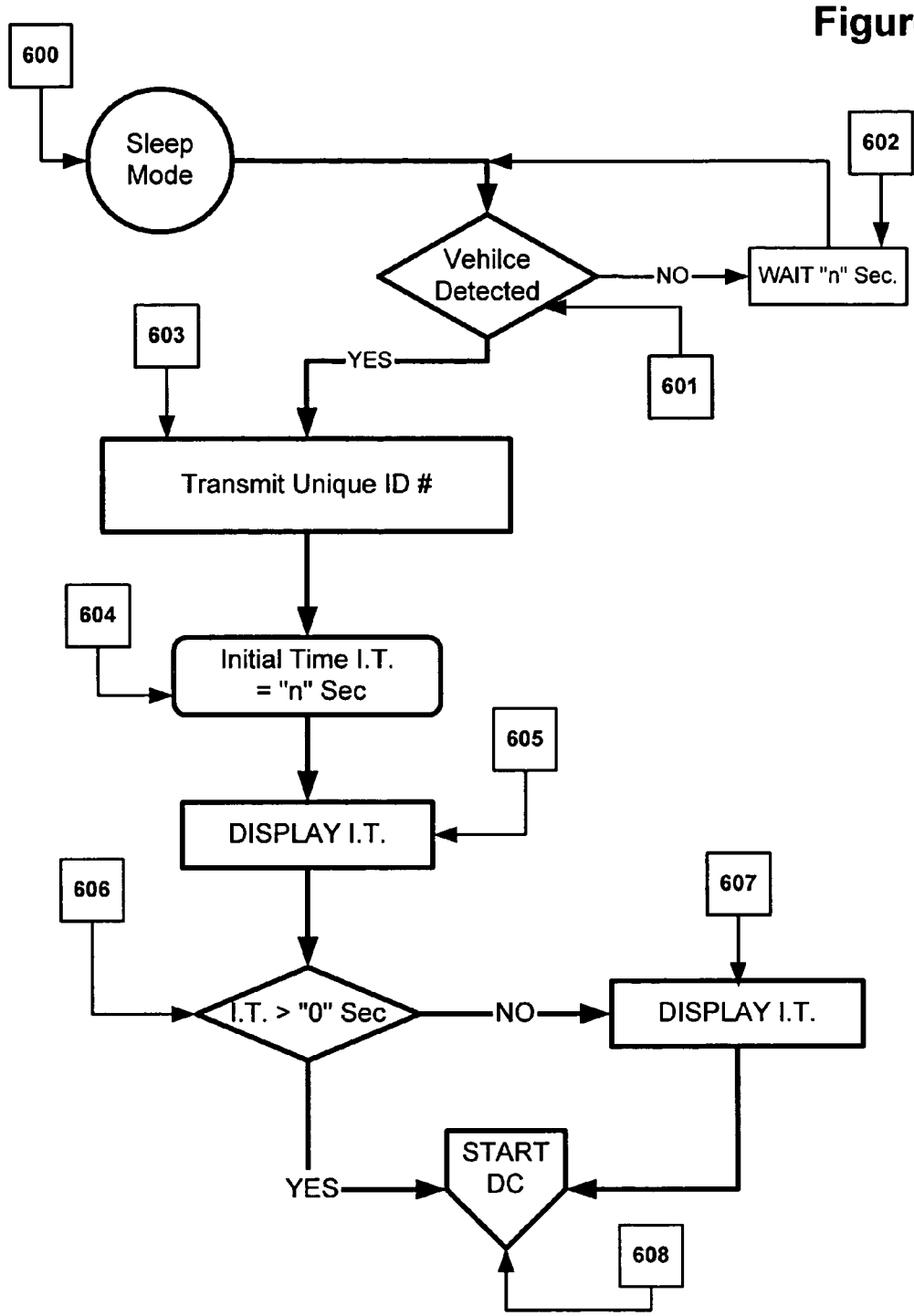
FIG. 8(a) is a flowchart of an embodiment depicting a process, in which an intelligent wireless communication device (IWCD) mounted inside a parking meter initiates a process to detect the presence of a vehicle in a metered zone.
Figure 8B:
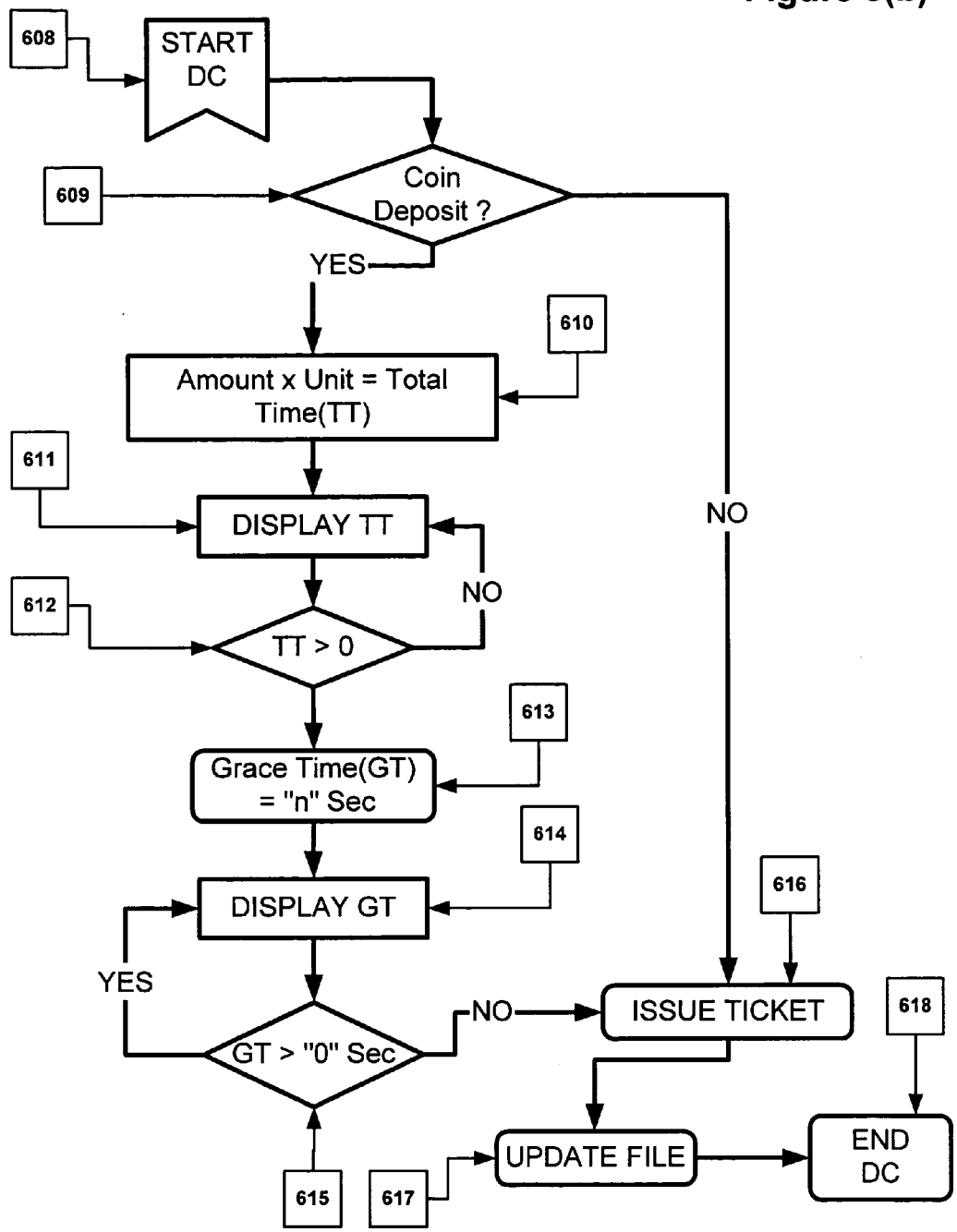
FIG. 8(b) is a flowchart of an exemplary process, in which an intelligent wireless communication device (IWCD) mounted inside a parking meter resumes an automated process to issue a summons if a violation occurs.

FIGS. 8(a) and 8(b) represent a flowchart of an exemplary process, in which a intelligent wireless communication device (IWCD) mounted inside the parking meter initiates the process to detect the presence of the vehicle in the metered zone. For the lower power consumption the intelligent wireless communication device (IWCD) mounted inside the parking meter device is programmed to go into a sleep mode if there is no activity in the metered zone. Step 601, if there is no vehicle in parking zone, parking device waits for "n" amount to seconds 602 and goes back to sleep mode 600. If the presence of a vehicle is detected in the metered zone, the parking meter device initiates broadcasting a unique parking identifying number 603.

As soon as the acknowledgement of transmission is completed, the parking meter device begins the initial count down for "n" minutes 604. The "n" minutes countdown of this embodiment of the invention is displayed on the LCD panel of parking meter 605. If the initial "n" minutes have passed, it informs the vehicle operator that a violation is in progress and a summons is being issued. As an alternative process, no violation transaction will be recorded if the vehicle is moved out of parking zone within a grace period of "n" minutes time. If the vehicle operator deposits the coin into coin slot 609, the total amount 610 (calculated according to local government rules and regulation) of parking time is displayed on the parking meter 611. If the displayed parking time is used up 612, the parking device provides the grace period of "n" minutes 613. The grace time is displayed on parking meter display panel 614. If the defined grace period 615 is used up, the parking violation is recorded and a summons 616 is issued. If the operator of vehicle deposits the coins within the grace period 613, the parking meter displays the calculated time of grace time used minus actual time owed. The parking meter updated its log file 617 and goes back to scan mode. Also when the grace period is active, if the operator of the vehicle decides to leave the parking area without paying the balance due the violation transaction is recorded and a summons may be issued. It would be clear to a practitioner of ordinary skill that the payment of the allotted parking time and place can be in various other forms of tender as can be arranged in the system. For example, the payment may include credit card, special parking permit, debit card, or a particular token.

Figure 8C:
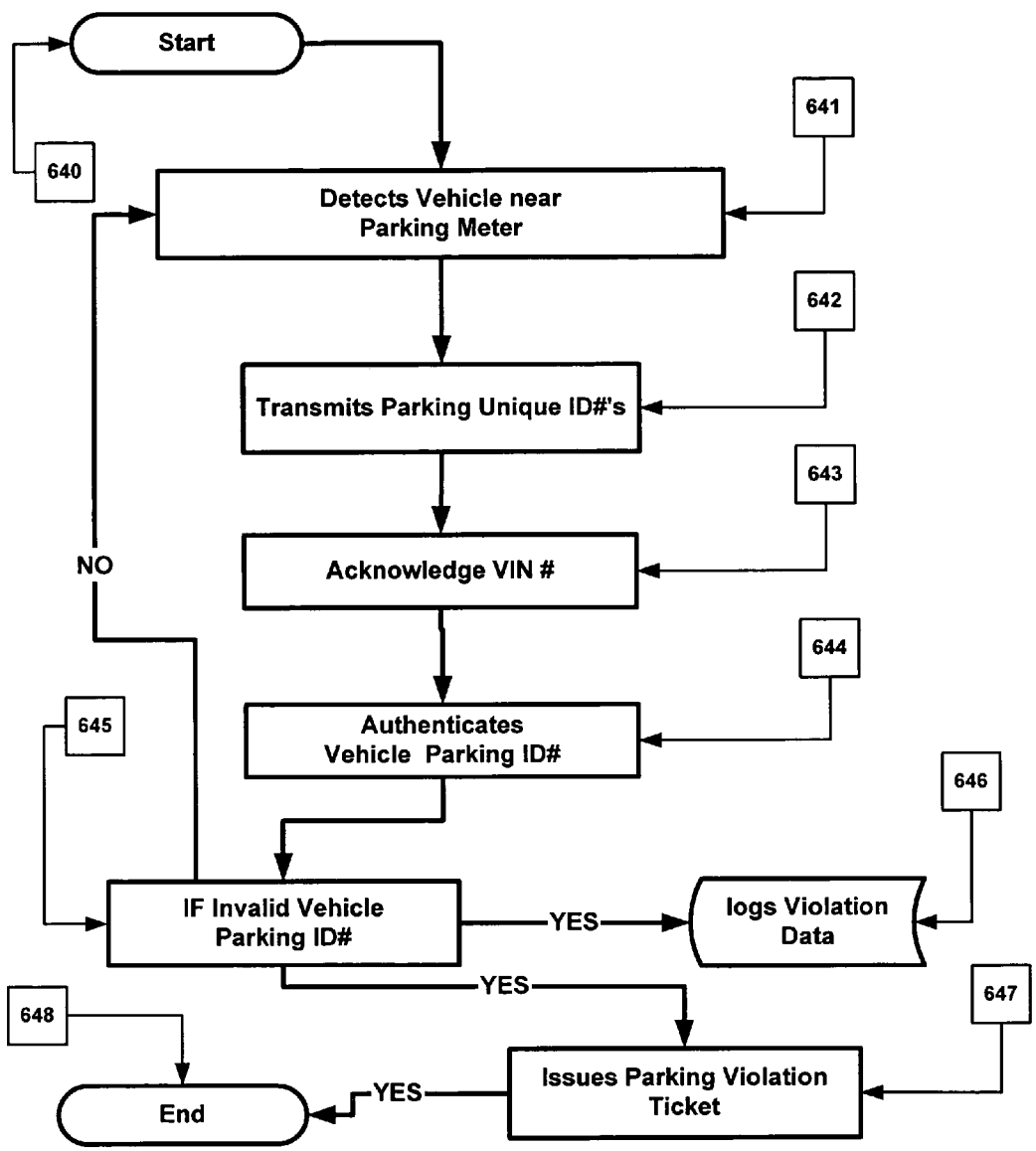
FIG. 8(c) is a flowchart authenticating the ARCS depicting a process, in which an Intelligent Wireless Communications Device (IWCS) is used to issue a violation or summons.

FIG. 8(*c*) is a flowchart of an exemplary process, in which a special parking identification number used by Government officials interacting with intelligent wireless communication device (IWCD) mounted inside the parking meter. The first step 641, the IWCD mounted inside the parking meter detects the presence of the vehicle. The parking device transmits the parking meter I.D. 642 and in process the ARCS transmits the vehicle information along with the special parking I.D. 643 issued by, e.g., the local government. Then the intelligent wireless communication device inside the parking meter authenticates the vehicle parking I.D. 644. If the vehicle parking I.D. is valid, it logs the transaction. In case the vehicle parking I.D. has expired or is invalid 646, it prompts the user to deposit the amount owed. If the operator of the vehicle fails to comply with the rules, the violation transaction is logged 646; consequently, a violation summons is issued to the owner/operator of the vehicle.

Figure 9A:
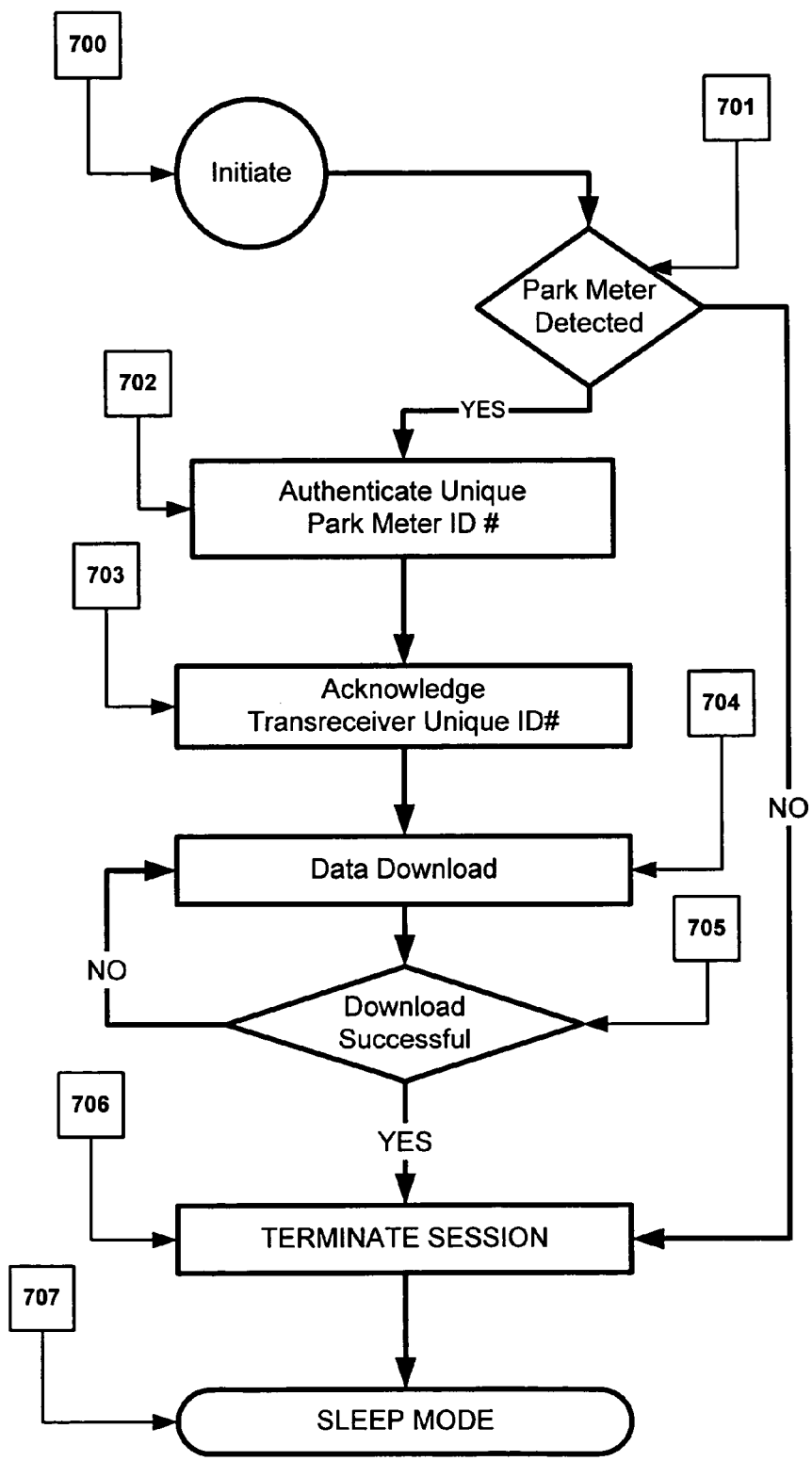
FIG. 9(a) is a flowchart depicting a process in which a transceiver (IT) unit downloads data from a special wireless communication device.
Figure 9B:
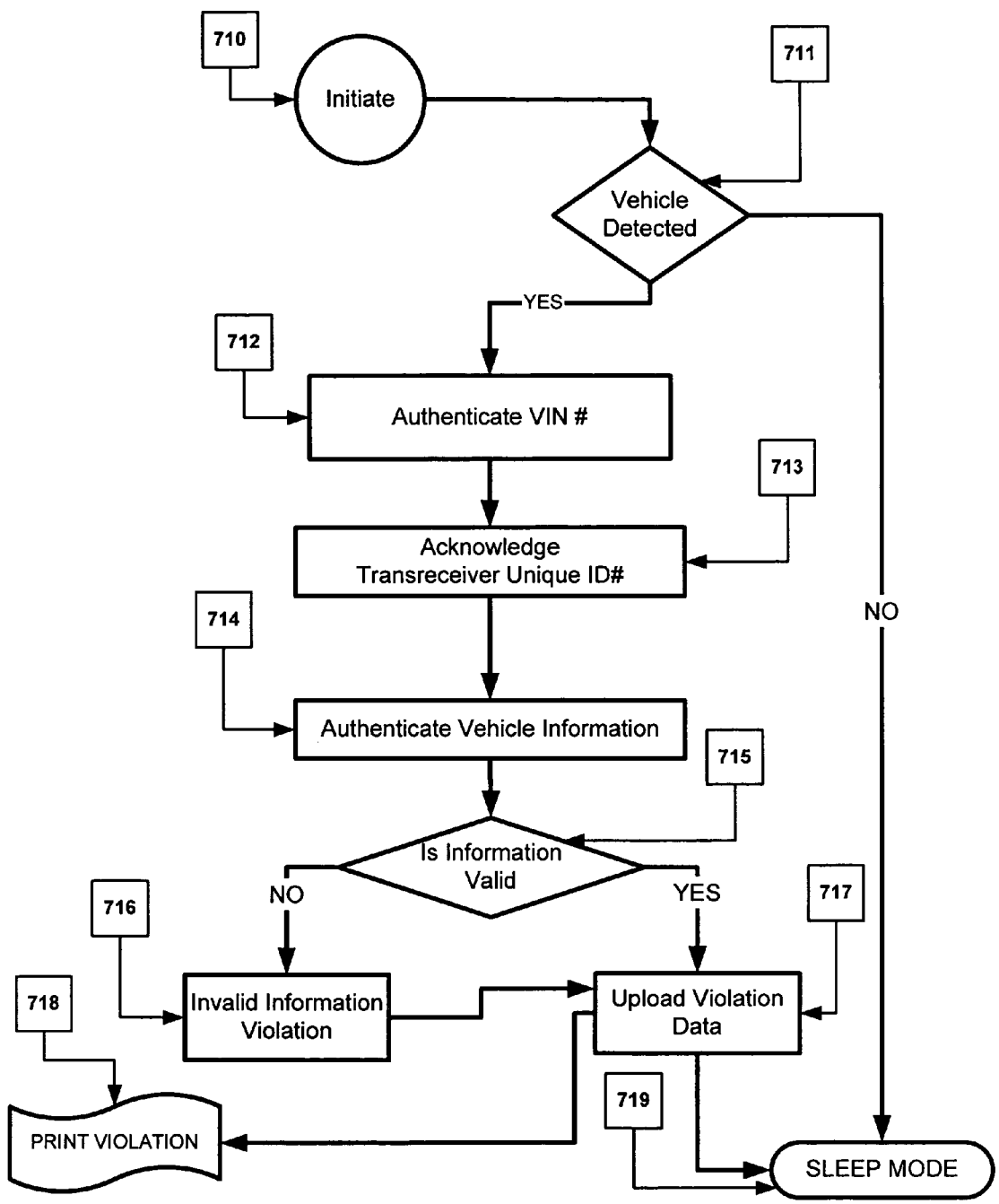
FIG. 9(b) is a flowchart depicting a process using an intelligent transceiver (IT) unit to authenticate an ARCS and issuing a violation summons.
Figure 9C:
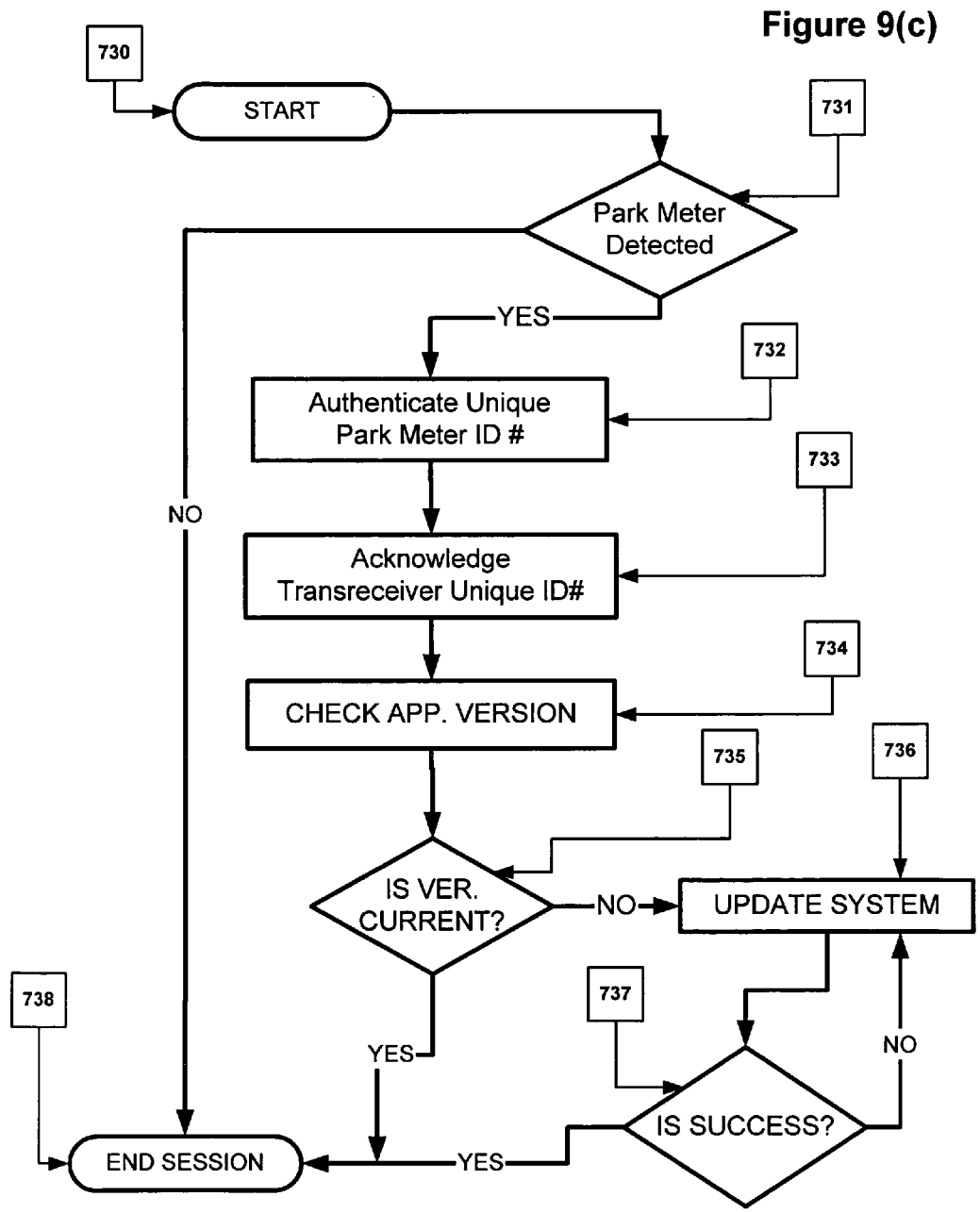
FIG. 9(c) is a flowchart of an embodiment depicting a process of an intelligent transceiver (IT) unit upgrading the system application on the special wireless communication device along with modifying the legal parameters from the intelligent wireless communication device (IWCD)

FIG. 9(*a*), is a flowchart of an exemplary process, in which an intelligent transceiver (IT) is in process to download the transaction log file from the intelligent wireless monitoring device (IWMD) or intelligent wireless communication device mounted on a roadside installation. Officials with special clearance will be provided the special access sequence to interact with intelligent wireless communication device (IWCD) mounted inside the parking meter and the intelligent wireless monitoring device (IWMD). In the first step 701, the intelligent wireless communication device (IWCD) mounted inside the parking meter is detected by the intelligent transceiver (IT). The intelligent transceiver (IT) authenticates the intelligent wireless communication device (IWCD) mounted inside the parking device or intelligent wireless monitoring device (IWMD) mounted on any roadside installation 702 and in the process, an intelligent transceiver (IT) transmits its transceiver ID 703. The transaction data is downloaded onto intelligent transceiver (IT), step-704. The download transaction in progress is logged step by step, which can be viewed real-time on the intelligent transceiver (IT). Once the transaction downloads successfully as step-705, the session between the intelligent transceiver (IT) and the wireless device is terminated in step 706.

FIG. 9(*b*) is a flowchart of an exemplary process, in which a transceiver is in process of authenticating the vehicle information and logging the violation transaction along with issuing the violation summons. In the first step-711 the vehicle information is authenticated by use of ARCS. The process is to authenticate the VIN step-712. In the process, the intelligent transceiver (IT) acknowledges the transceiver ID, step-713. On a successful handshake of both components of the process, the equipment the ARCS transmits the mandatory information towards intelligent transceiver (IT) Then in step-714, the intelligent transceiver (IT) authenticates the vehicle information along with other mandatory information required by local authorities. If the information is not valid 715 then the intelligent transceiver (IT) issues the violation summons along with any other additional violations 716. The violation transaction is logged and simultaneously uploaded to ARCS 717. This log/data may be printed 718 and appended to the vehicle log file.

FIG. 9(*c*), is a flowchart of an exemplary process, in which an intelligent transceiver (IT) is in the process to update the information on intelligent wireless communication device (IWCD) mounted inside the parking meter or intelligent wireless monitoring device (IWMD) mounted on a roadside installation. The local officials will be provided the special access sequence to interact with intelligent wireless communication device (IWCD) mounted inside the parking meter and intelligent monitoring device (IMD) similar to a transaction log download. The first step-731, the intelligent wireless communication device (IWCD) mounted inside the parking meter or intelligent monitoring device mounted on any roadside installation detects the intelligent transceiver (IT). The IT authenticates the intelligent wireless communication device (IWCD) or intelligent monitoring device (IMD) 732 and in the process, the IT transmits its transceiver ID 733. The transaction data is uploaded onto the intelligent wireless communication device (IWCD) mounted inside the parking meter or intelligent monitoring device (IMD) mounted on any roadside installation. In case of system application update, the intelligent transceiver (IT) checks the system version step-734. If the system version is not up to date, it commences the system update step-736. The entire transaction is logged real-time and can be simultaneously monitored on the intelligent transceiver (IT). Once the transaction is successful step-737 the session between the intelligent transceiver (IT) and wireless device is terminated-step 738.

Figure 10:
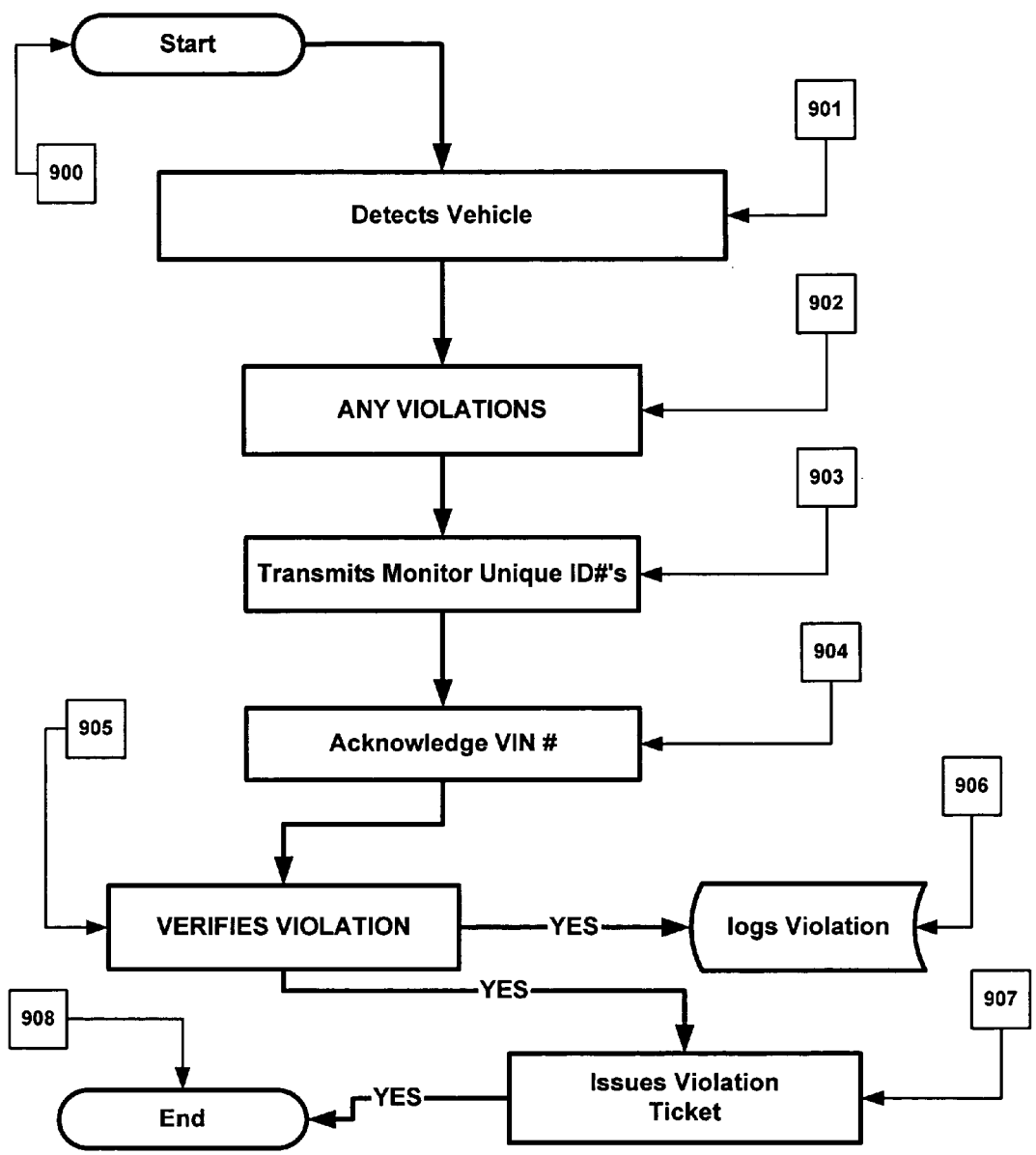
FIG. 10 is a flowchart of an embodiment depicting a process of an intelligent wireless monitoring device (IWMD) unit authenticating the ARCS and issuing a violation summons.

FIG. 10 is a flowchart of an exemplary process, in which an intelligent transceiver (IT) is in the process to issue the violation occurred. The first step-901, the intelligent transceiver (IT) detects the vehicle ARCS. Then the IT interrogates the vehicle for any violation pending on the system 902. The transceiver transmits a unique identifier number 903 to the vehicle ARCS. The ARCS acknowledges the transceiver unique identifier number to initiate the query 904. If there are any violations pending or new violation has taken place 905, the transaction is logged along with the violation codes 906. The violation summons in issued to ARCS and operator of the vehicle in informed with the reasons of violation 907.

As would be readily apparent to the skilled artisan, the description of certain embodiments of the invention set forth above does not preclude or limit additional embodiments or versions of applying the advantageous control of vehicular traffic and location by the automatic registration and monitoring or tracking system according to the invention, as claimed.

We claim:

1. A programmed method for automatically wirelessly registering, monitoring, and controlling without need for human intervention, a vehicle legally or illegally occupying a defined restricted-access zone, comprising:

(i) programming a vehicle operating system comprising a vehicle controller module independently powered in coordination with an authentication module loaded with a two-level authentication process for the prevention of theft or vandalism;

(ii) automatically communicating vehicle identity data and location data via a transceiver information from a vehicle by a wireless signal to an intelligent wireless communication device suitably mounted at a location to identify and monitor the vehicle within a defined restricted access zone;

(iii) registering the wireless signal in the intelligent wireless communication device and communicating by signal emission/reception through an external interface to and from a device with data access identifying registration, license, maintenance, and insurance, a device for monitoring an overall registration system, a programmable device updated with changing conditions and regulations, an automated device for revenue collection, thereby ascertaining the identity and location of the vehicle within the defined restricted-access zone;

(iv) returning information from the intelligent wireless monitoring device to the vehicle legally occupying within the defined restricted access zone wirelessly disclosing the conditions and parameters of time and place of the vehicle location issuing a permit or receipt; or, alternatively, (v) returning information from the intelligent wireless monitoring device to the vehicle legally occupying within the defined restricted access zone wirelessly disclosing the conditions and parameters of time and place of the vehicle location and issuing a warning or penalty to the vehicle; and thereby wirelessly controlling vehicle stopping, standing and/or parking in said restricted space; and (vi) wirelessly disabling the vehicle operation in case of intrusion, theft or vandalism of vehicle circuitry components, the transceiver signaling to shut down vehicle operation unless, in case of error, the vehicle operator exercises control to override the vehicle shutdown by providing a two-level security authentication code.

2. The method of claim 1, wherein the defined restricted-access zone comprises a parking space, a vehicle loading zone, a taxi stand, a diplomat-reserved space, and a purchase or personnel pick-up zone.

3. The method of claim 1, wherein the vehicle identity data comprises a vehicle identification number or code.

4. The method of claim 1 wherein other vehicle-associated information is communicated, selected from registration, insurance, ownership, and access permit information.

5. The method of claim 1, wherein the intelligent communication device is mounted in a parking meter.

6. The method of claim 1, wherein the parameters of time and place comprise data relating to an elapsed parking time period, a parking time limit, a parking fee, and a type of required payment.

7. A method for automated law enforcement, said method comprising a step of:
(a) communicating via wireless means vehicle information to a intelligent wireless communication device (IWCD) mounted inside the group consisting of a parking meter, a roadside installation; and
(b) using said vehicle information in said IWCD to automatically generate a signal comprising vehicle's control instructions from information communicated by signal emission/reception through an external interface to and from a device with data access identifying registration, license, maintenance, and insurance, a device for monitoring an overall registration system, a programmable device updated with changing conditions and regulations, and an automated device for revenue collection; and
(c) wirelessly disabling the vehicle operation in case of intrusion, theft or vandalism of the vehicle components, the IWCD signaling to shut down vehicle operation unless, in case of error, the vehicle operator exercises control to override the vehicle shutdown by providing a two-level security authentication code.

8. The method according to claim 7, wherein the IWCD is installed in a parking meter.

9. The method according to claim 7, wherein the vehicle is selected from the group consisting of: an automobile, a truck, a bus, train, tractor, crane, a 2- or 3-wheel conveyance, and a motorcycle.

10. The method according to claim 7, wherein said wireless means comprises:
WLAN 802.1 lx and 802.16 x standards means;
Radio Frequency means;
Bluetooth means; and
Infra Red means.

11. The method according to claim 7, wherein said signal comprising vehicle control instruction not generated in pre-defined exception conditions includes use of the parking space for emergency purposes.

12. The method according to claim 11, wherein the pre-defined exception condition entails emergency situations.

13. The method according to claim 12, wherein an emergency situation comprises an emergency parking for law enforcement personnel, fire hydrants, Bus stops, designated zones and the like.

14. The method according to claim 13, wherein the emergency situations are pre-stored in one of:
a control system installed in the moving vehicle and configured to restrict the use of the parking zone when a safety hazard exists;
an automobile registry communication system (ARCS);
an intelligent wireless communication device (IWCD) mounted inside a parking meter; and an intelligent wireless monitoring device (IWMD) mounted on a roadside installation.

* * * * *